(12) United States Patent
Ikeda

(10) Patent No.: US 9,030,436 B2
(45) Date of Patent: May 12, 2015

(54) INFORMATION PROCESSING APPARATUS, INFORMATION PROCESSING METHOD, AND PROGRAM FOR PROVIDING SPECIFIC FUNCTION BASED ON RATE OF CHANGE OF TOUCH PRESSURE INTENSITY

(75) Inventor: Tetsuo Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 12/860,523

(22) Filed: Aug. 20, 2010

(65) Prior Publication Data

US 2011/0050630 A1  Mar. 3, 2011

(30) Foreign Application Priority Data

Aug. 28, 2009  (JP) ................ P2009-198472

(51) Int. Cl.
*G06F 3/041* (2006.01)
*G06F 3/0488* (2013.01)

(52) U.S. Cl.
CPC ............ *G06F 3/0488* (2013.01); *G06F 3/0414* (2013.01)

(58) Field of Classification Search
CPC ...... G06F 3/0414; G06F 3/044; G06F 3/0488
USPC .................................................. 345/156–184
See application file for complete search history.

(56) References Cited

U.S. PATENT DOCUMENTS

| | | | |
|---|---|---|---|
| 5,912,659 A * | 6/1999 | Rutledge et al. | 345/156 |
| 6,414,671 B1 * | 7/2002 | Gillespie et al. | 345/157 |
| 7,629,966 B2 * | 12/2009 | Anson | 345/173 |
| 7,683,889 B2 * | 3/2010 | Rimas Ribikauskas et al. | 345/173 |
| 7,772,960 B2 * | 8/2010 | Baker | 338/99 |
| 2003/0038824 A1 * | 2/2003 | Ryder | 345/684 |
| 2003/0137494 A1 * | 7/2003 | Tulbert | 345/173 |
| 2003/0206162 A1 * | 11/2003 | Roberts | 345/173 |
| 2004/0246228 A1 * | 12/2004 | Nurmi | 345/156 |
| 2006/0132457 A1 * | 6/2006 | Rimas-Ribikauskas et al. | 345/173 |
| 2006/0186207 A1 * | 8/2006 | Wulff et al. | 235/462.48 |
| 2007/0046649 A1 * | 3/2007 | Reiner | 345/173 |
| 2008/0246730 A1 * | 10/2008 | Simons | 345/164 |
| 2009/0066660 A1 * | 3/2009 | Ure | 345/173 |
| 2009/0128498 A1 * | 5/2009 | Hollemans et al. | 345/173 |
| 2009/0225043 A1 * | 9/2009 | Rosener | 345/173 |
| 2009/0309616 A1 * | 12/2009 | Klinghult et al. | 324/686 |
| 2010/0045667 A1 * | 2/2010 | Kornmann et al. | 345/419 |
| 2010/0127983 A1 * | 5/2010 | Irani et al. | 345/163 |
| 2011/0090147 A1 * | 4/2011 | Gervais et al. | 345/157 |
| 2012/0105358 A1 * | 5/2012 | Momeyer et al. | 345/174 |
| 2012/0105371 A1 * | 5/2012 | Hotelling et al. | 345/174 |
| 2012/0154329 A1 * | 6/2012 | Shinozaki | 345/174 |

FOREIGN PATENT DOCUMENTS

JP    2006-39745    2/2006

* cited by examiner

*Primary Examiner* — Dwayne Bost
*Assistant Examiner* — Larry Sternbane
(74) *Attorney, Agent, or Firm* — Sherr & Jiang, PLLC

(57) ABSTRACT

Provided is an information processing apparatus including a pressure intensity detection unit that detects pressure intensity of an operating tool pressing a screen, a change rate detection unit that detects a rate of change of the pressure intensity based on information on the pressure intensity detected by the pressure intensity detection unit, and a function providing unit that provides a specific function in a case the rate of change of the pressure intensity detected by the change rate detection unit is high, and cancels an operation by the operating tool without providing the specific function in a case the rate of change of the pressure intensity is low.

12 Claims, 15 Drawing Sheets

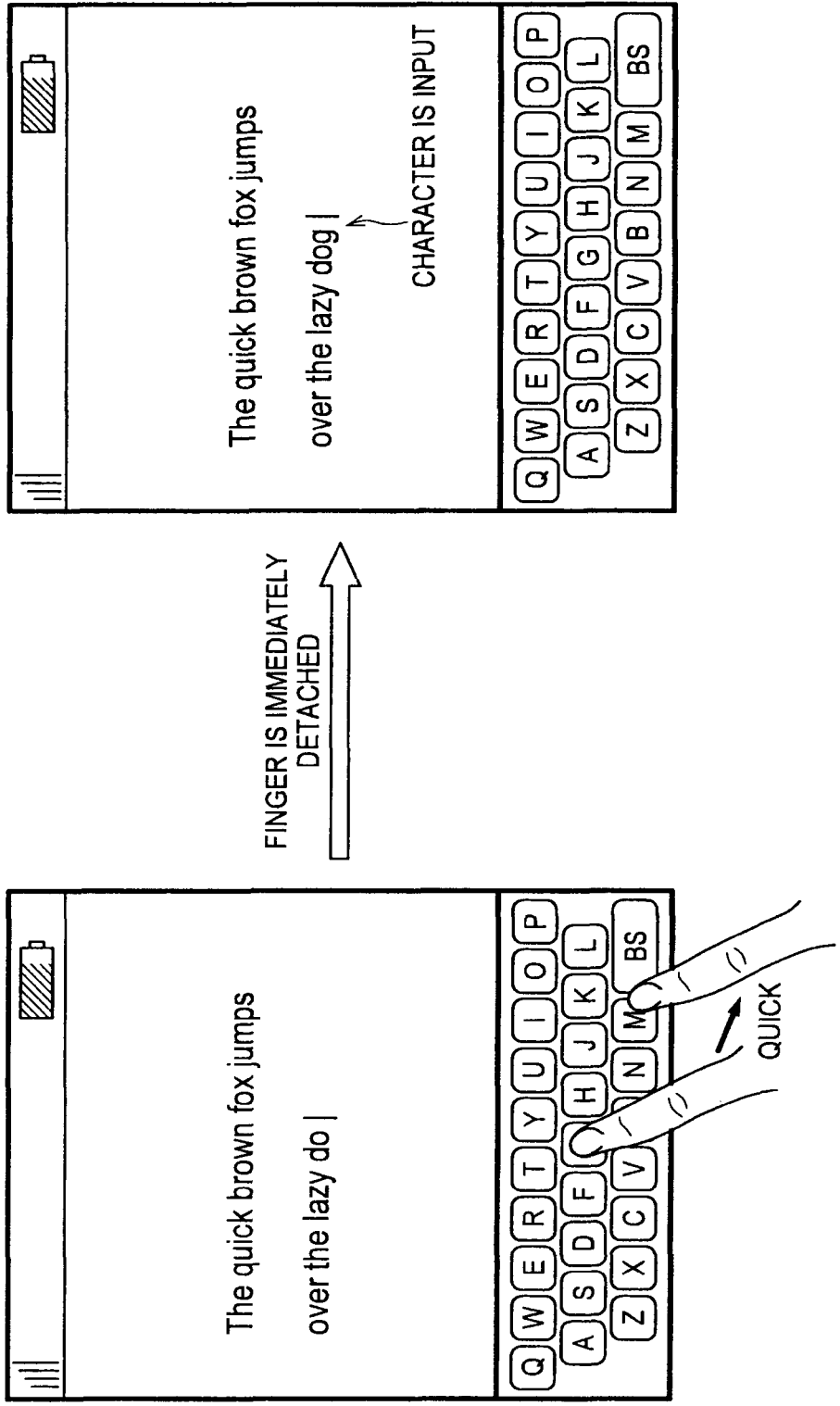

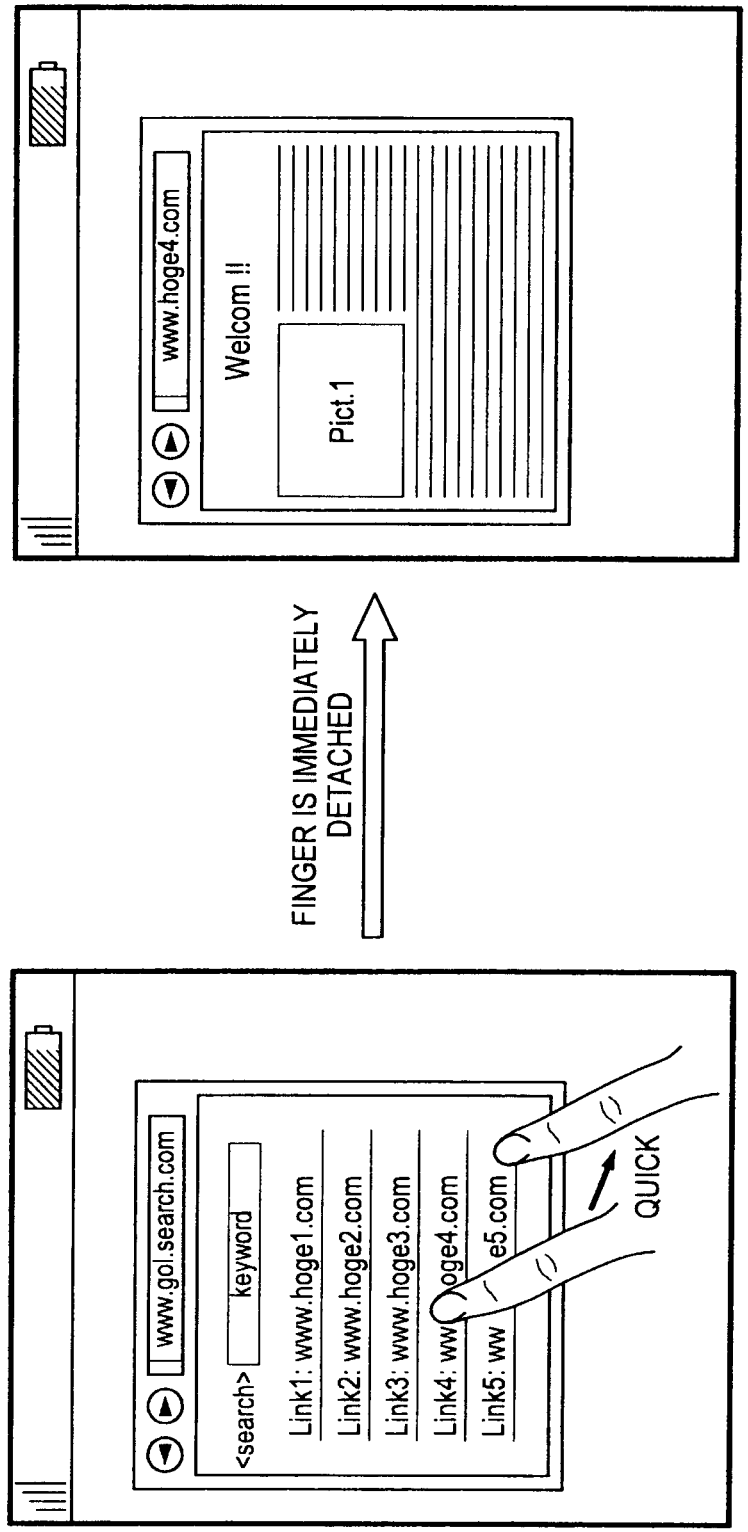

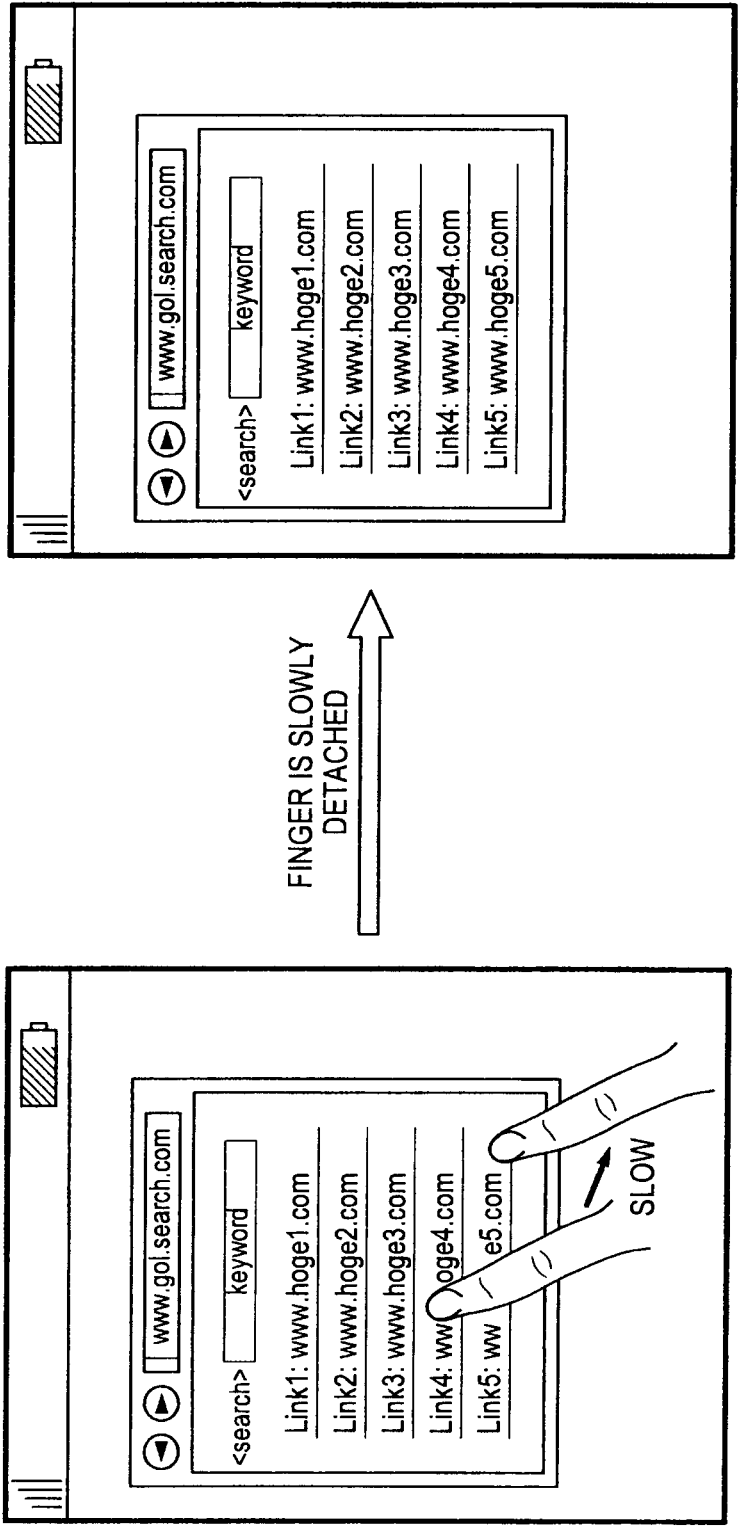

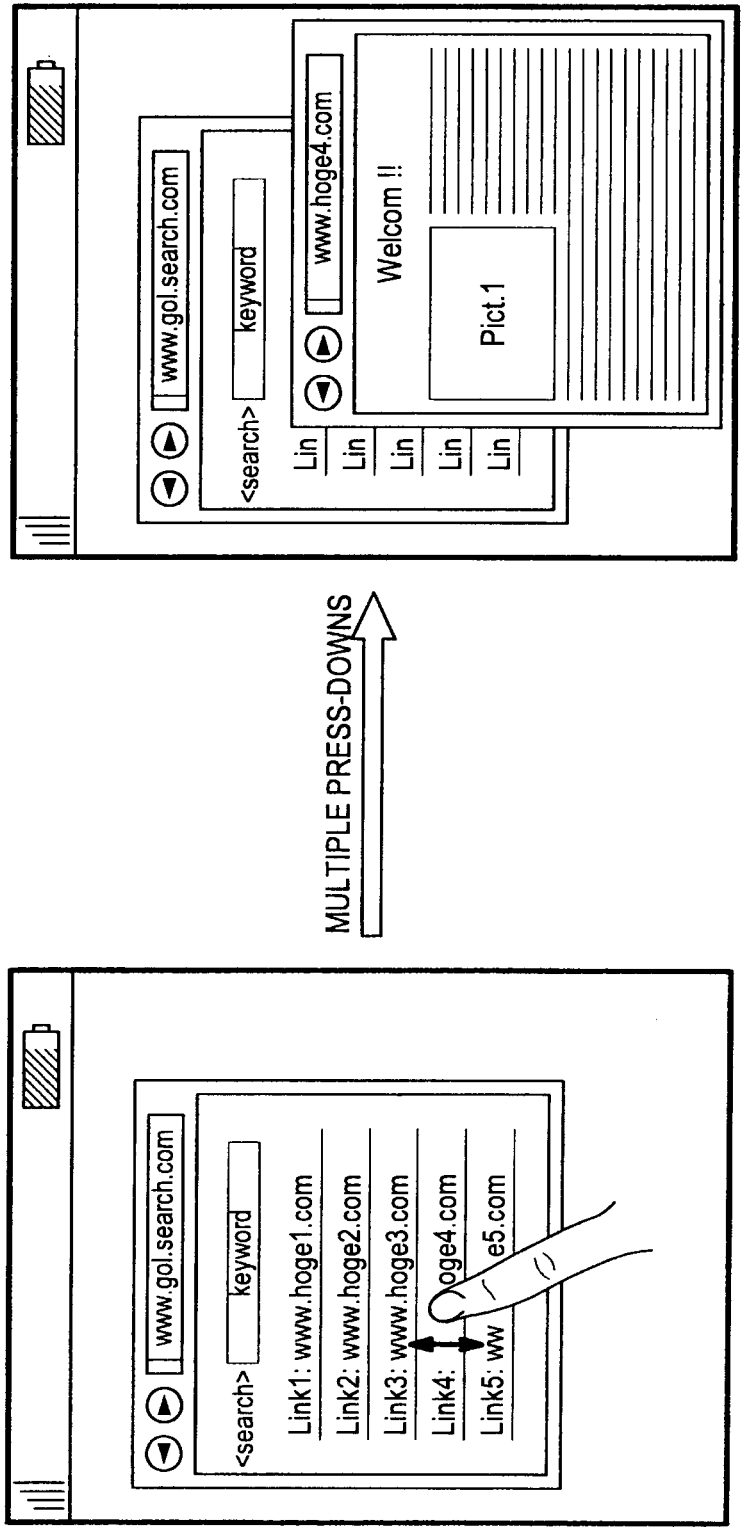
FIG.6C  MULTIPLE PRESS-DOWN MOTION → DISPLAY LINK DESTINATION ON SEPARATE WINDOW

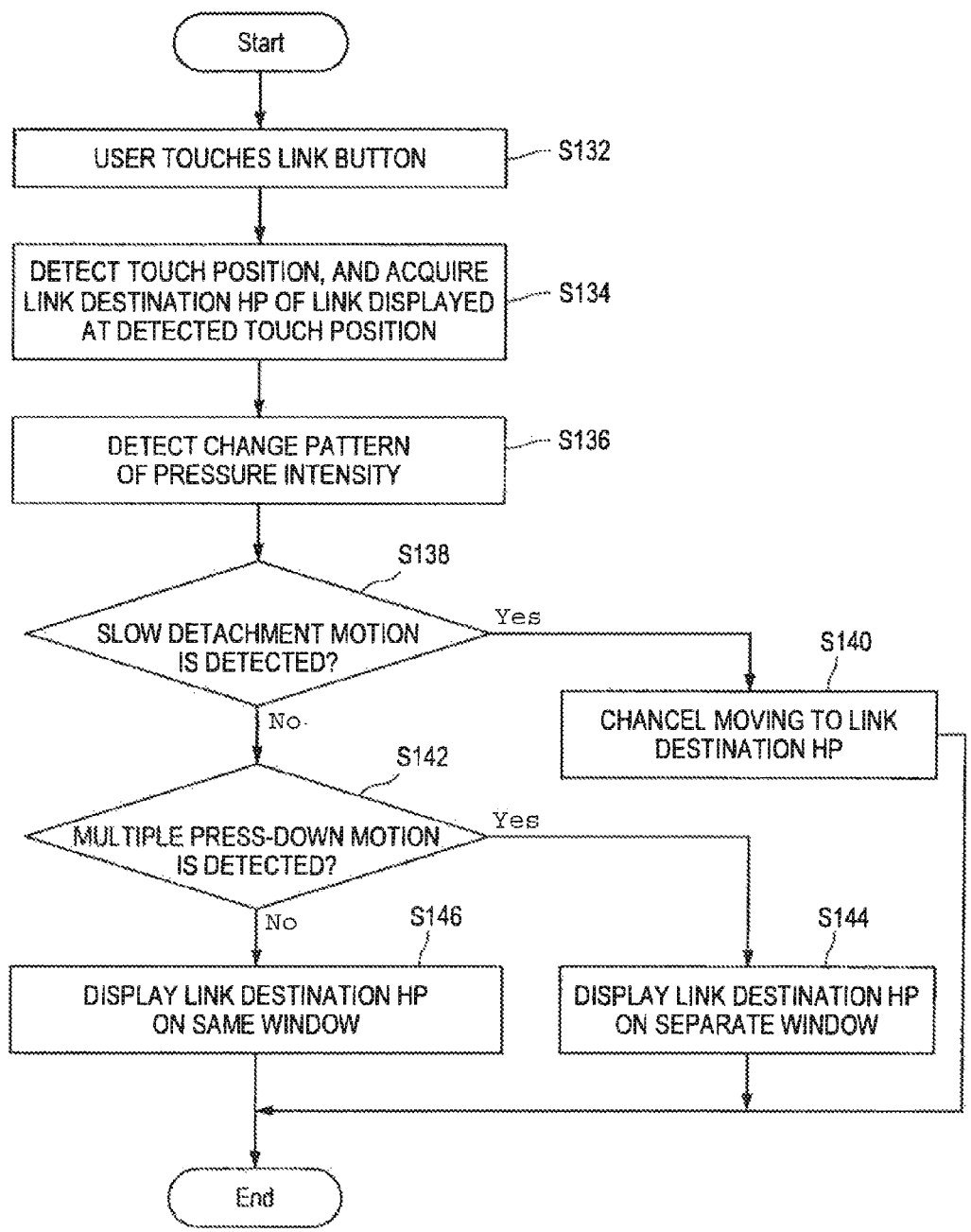

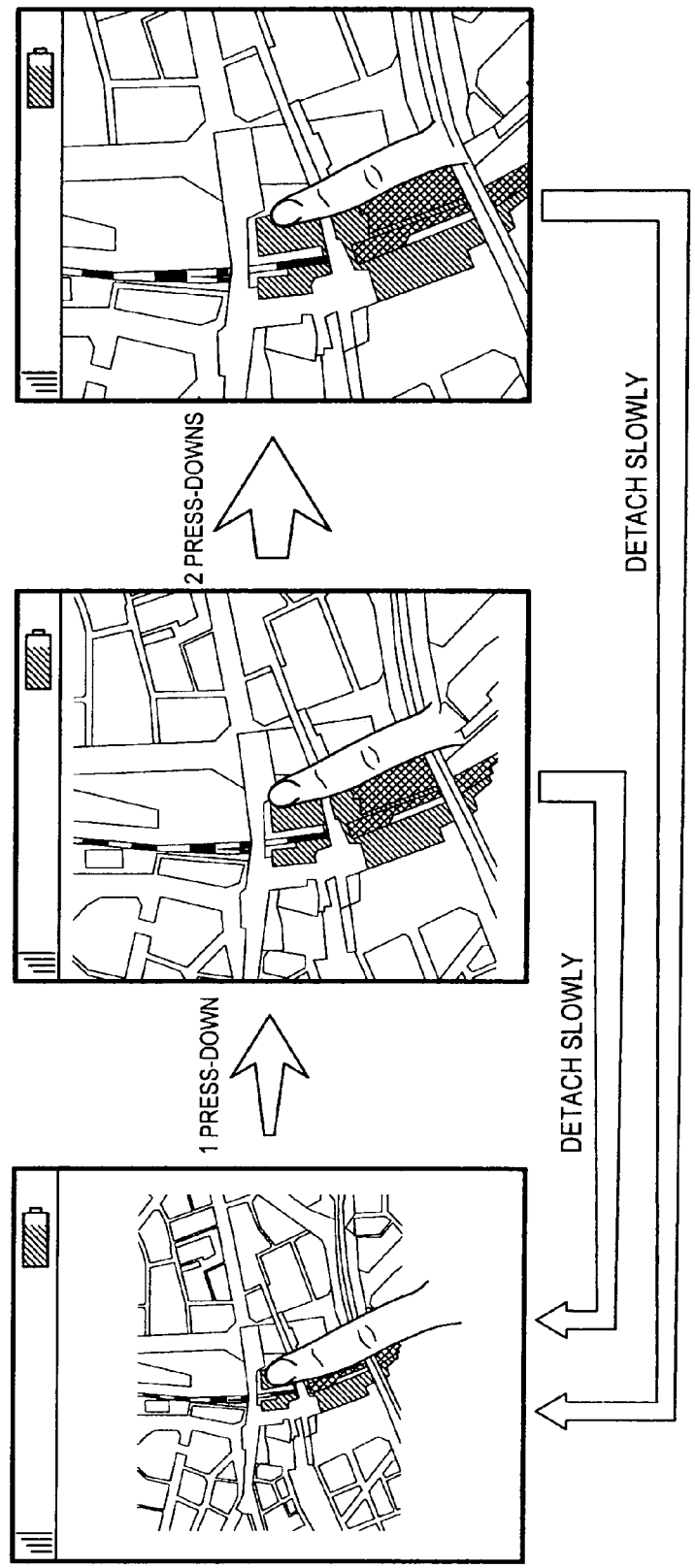

INFORMATION PROCESSING APPARATUS, INFORMATION PROCESSING METHOD, AND PROGRAM FOR PROVIDING SPECIFIC FUNCTION BASED ON RATE OF CHANGE OF TOUCH PRESSURE INTENSITY

BACKGROUND OF THE INVENTION

1. Field of the Invention

The present invention relates to an information processing apparatus, an information processing method, and a program.

2. Description of the Related Art

In recent years, a touch panel has come to be widely used by an electronic device, such as a mobile phone, a portable information terminal or the like, as an input device. The touch panel is installed in a display device such as a liquid crystal display, an organic electroluminescence display or the like. As types of touch panel, a resistive touch panel, a capacitive touch panel, and an optical touch panel are known, for example. Any of these types allows a user to perform a desired operation by directly touching or dragging an operation object displayed on the display device. Therefore, an extremely intuitive operating system is realized.

As technology relating to a touch panel, JP-A-2006-39745 discloses technology for detecting a pressure at the time of a user pressing a touch panel, and for scrolling the displayed content of a display device according to the pressure. Also, this patent document discloses technology for detecting a pressing time at the time of the user pressing the touch panel, and for scrolling the displayed content of the display device according to the length of the pressing time. Furthermore, this patent document discloses technology for taking, as a selection target, display content that is displayed at the timing the pressure becomes constant.

SUMMARY OF THE INVENTION

However, with the configuration according to which the displayed content is scrolled in accordance with the increase in the pressure, in a case a long distance is to be scrolled, one has to press the touch panel with a greater force as the scrolling goes on. As a result, not only is the operability deteriorated, but life of the touch panel becomes shorter. Also, according to the method described in this patent document, the operation that is realized is the same even if the pressure is changed suddenly or over time.

In light of the foregoing, it is desirable to provide an information processing apparatus, an information processing method, and a program which are new and improved, and which are capable of expanding an operating system by using the rate of change of the pressure, thereby improving a user's operational efficiency.

According to an embodiment of the present invention, there is provided an information processing apparatus which includes a pressure intensity detection unit that detects pressure intensity of an operating tool pressing a screen, a change rate detection unit that detects a rate of change of the pressure intensity based on information on the pressure intensity detected by the pressure intensity detection unit, and a function providing unit that provides a specific function in a case the rate of change of the pressure intensity detected by the change rate detection unit is high, and cancels an operation by the operating tool without providing the specific function in a case the rate of change of the pressure intensity is low.

Furthermore, the information processing apparatus may further include an increase/decrease counter that counts, in a case the pressure intensity detected by the pressure intensity detection unit does not become zero but repeats increasing and decreasing, the number of repetitions of the increase and decrease. The function providing unit may provide the specific function that is different depending on the number of the repetitions of the increase and decrease counted by the increase/decrease counter.

When an input operation of a character is performed by the operating tool, the function providing unit may confirm the character input by the operating tool in a case the rate of change of the pressure intensity detected by the change rate detection unit is high, and may cancel the input operation of the character in a case the rate of change of the pressure intensity detected by the change rate detection unit is low.

When an update operation on display content of a first window displayed within the screen is performed by the operating tool, the function providing unit may update the display content of the first window in a case the rate of change of the pressure intensity detected by the change rate detection unit is high and the number of the repetitions of the increase and decrease counted by the increase/decrease counter is a first specific number, may display a display content after update on a second window different from the first window in a case the rate of change of the pressure intensity detected by the change rate detection unit is high and the number of the repetitions of the increase and decrease counted by the increase/decrease counter is a second specific number, and may cancel the update operation on the display content of the first window in a case the rate of change of the pressure intensity detected by the change rate detection unit is low.

The function providing unit may enlarge and display an image that is an enlargement target at a magnification that is different depending on the number of the repetitions of the increase and decrease counted by the increase/decrease counter, in a case the rate of change of the pressure intensity detected by the change rate detection unit is high, and may cancel an enlargement operation on the image that is an enlargement target in a case the rate of change of the pressure intensity detected by the change rate detection unit is low.

Furthermore, the information processing apparatus may further include a position detection unit that detects a position of the operating tool pressing the screen, and a movement detection unit that detects a movement of the operating tool based on information on the position detected by the position detection unit. When selection of a character string is performed by the movement of the operating tool, the function providing unit may perform processing regarding the character string selected during the movement of the operating tool, in a case the rate of change of the pressure intensity detected by the change rate detection unit is high after detection of a rest state or a subtly-moving state of the operating tool by the movement detection unit, and may cancel a processing operation regarding the character string selected during the movement of the operating tool in a case the rate of change of the pressure intensity detected by the change rate detection unit is low after the detection of the rest state or the subtly-moving state of the operating tool.

Furthermore, the information processing apparatus may further include a light source that emits light from within the screen, and an optical sensor that is capable of detecting intensity of light that is reflected by the operating tool pressing the screen at a time the light is emitted from the light source. The pressure intensity detection unit may detect an area of the operating tool that strongly reflected the light emitted from the light source based on the intensity of light detected by the optical sensor, and detects the pressure intensity based on a size of the area.

Furthermore, the information processing apparatus may further include a pressure sensor capable of detecting a pressure, the pressure sensor being provided on the screen. The pressure intensity detection unit may detect the pressure intensity of the operating tool based on a level of the pressure detected by the pressure sensor.

According to another embodiment of the present invention, there is provided an information processing apparatus which includes a pressure intensity detection unit that detects pressure intensity of an operating tool pressing a screen, a change rate detection unit that detects a rate of change of the pressure intensity based on information on the pressure intensity detected by the pressure intensity detection unit, and a function providing unit that provides a first function in a case the rate of change of the pressure intensity detected by the change rate detection unit is high, and provides a second function different from the first function in a case the rate of change of the pressure intensity is low.

According to another embodiment of the present invention, there is provided an information processing method which includes the steps of detecting pressure intensity of an operating tool pressing a screen, detecting a rate of change of the pressure intensity based on information on the pressure intensity detected in the step of detecting pressure intensity, and providing a specific function in a case the rate of change of the pressure intensity detected in the step of detecting a rate of change is high, and cancelling an operation by the operating tool without providing the specific function in a case the rate of change of the pressure intensity is low.

According to another embodiment of the present invention, there is provided an information processing method which includes the steps of detecting pressure intensity of an operating tool pressing a screen, detecting a rate of change of the pressure intensity based on information on the pressure intensity detected in the step of detecting pressure intensity, and providing a first function in a case the rate of change of the pressure intensity detected in the step of detecting a rate of change is high, and providing a second function different from the first function in a case the rate of change of the pressure intensity is low.

According to another embodiment of the present invention, there is provided a program for causing a computer to realize a pressure intensity detection function that detects pressure intensity of an operating tool pressing a screen, a change rate detection function that detects a rate of change of the pressure intensity based on information on the pressure intensity detected by the pressure intensity detection function, and a function providing function that provides a specific function in a case the rate of change of the pressure intensity detected by the change rate detection function is high, and cancels an operation by the operating tool without providing the specific function in a case the rate of change of the pressure intensity is low.

According to another embodiment of the present invention, there is provided a program for causing a computer to realize a pressure intensity detection function that detects pressure intensity of an operating tool pressing a screen, a change rate detection function that detects a rate of change of the pressure intensity based on information on the pressure intensity detected by the pressure intensity detection function, and a function providing function that provides a first function in a case the rate of change of the pressure intensity detected by the change rate detection function is high, and provides a second function different from the first function in a case the rate of change of the pressure intensity is low.

According to another embodiment of the present invention, there is provided a recording medium in which the program is recorded, the recording medium being able to be read by a computer.

According to the embodiments of the present invention described above, a user's operational efficiency can be improved.

BRIEF DESCRIPTION OF THE DRAWINGS

FIG. 4A is an explanatory diagram showing an example of an information processing method according to the embodiment (tap operation→enter a character);

FIG. 6A is an explanatory diagram showing an example of the information processing method according to the embodiment (tap operation→move to a link destination);

FIG. 6B is an explanatory diagram showing an example of the information processing method according to the embodiment (motion of slowly detaching a finger→cancel);

FIG. 6C is an explanatory diagram showing an example of the information processing method according to the embodiment (multiple press-down motion→display a link destination on a separate window);

FIG. 7 is an explanatory diagram showing an example of the operational flow of the information processing apparatus according to the embodiment (operation of moving to a link destination);

FIG. 8 is an explanatory diagram showing an example of the information processing method according to the embodiment (application to a map application);

DETAILED DESCRIPTION OF THE EMBODIMENT(S)

Figure 1:
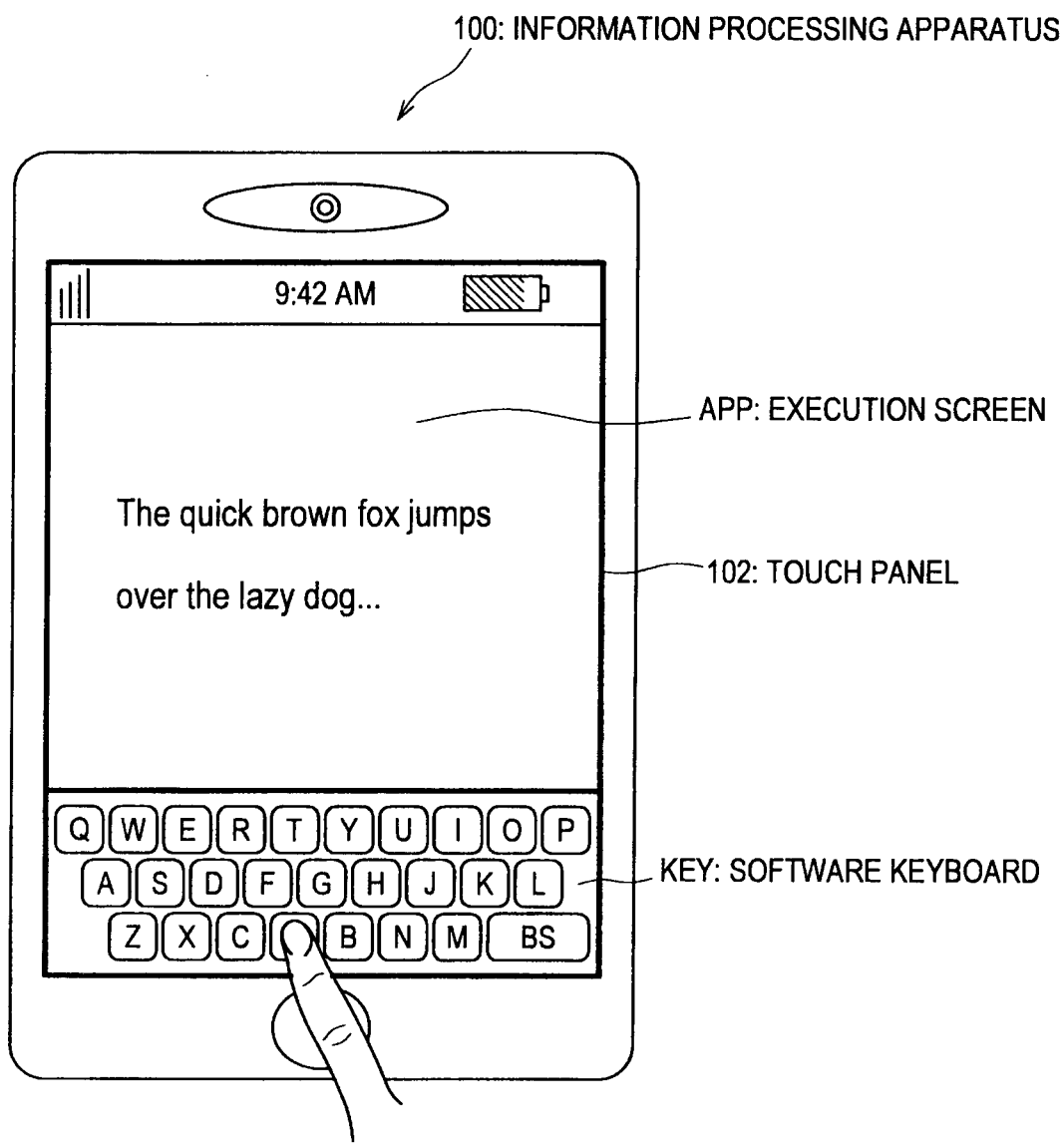
FIG. 1 is an explanatory diagram showing an external appearance of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of description of an embodiment of the present invention described below will be briefly mentioned here.

First, an external appearance of an information processing apparatus 100 according to the first embodiment of the present invention will be described with reference to FIG. 1. Then, a functional configuration of the information processing apparatus 100 according to the embodiment will be described with reference to FIG. 2. Then, input pattern detection methods according to the embodiment will be described with reference to FIGS. 3A to 3C.

Figure 4B:
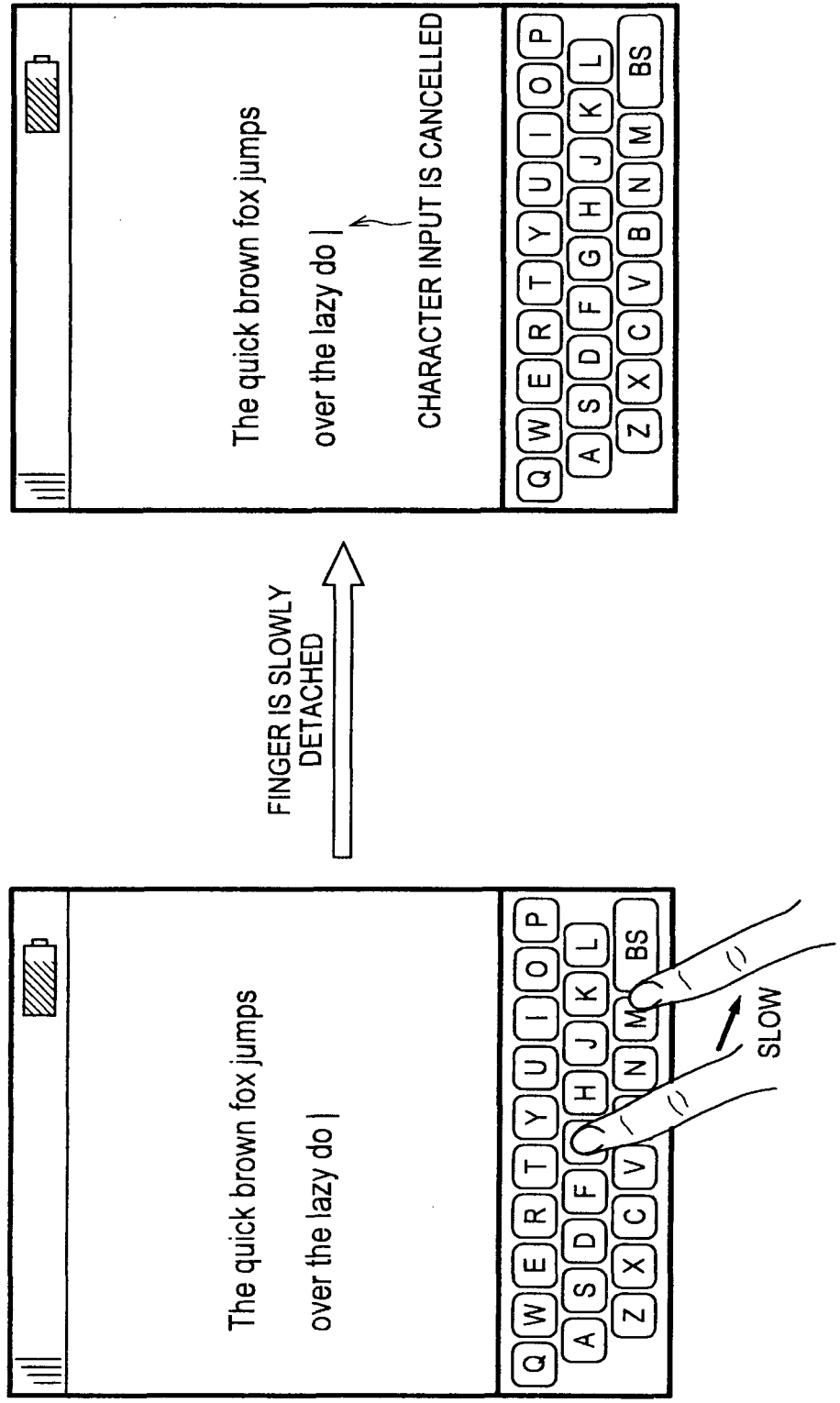
FIG. 4B is an explanatory diagram showing an example of the information processing method according to the embodiment (motion of slowly detaching a finger→cancel)

Next, application to character string processing will be described with reference to FIGS. 4A and 4B, as concrete examples of an information processing method according to the embodiment. Then, an operational flow of the information processing apparatus 100 according to this application will be described with reference to FIG. 5.

Next, application to a Web application will be described with reference to FIGS. 6A to 6C, as concrete examples of an information processing method according to the embodiment. Then, an example of the operational flow of the information processing apparatus 100 according to this application will be described with reference to FIG. 7. Then, application to a map application will be described with reference to FIG. 8, as a concrete example of the information processing method according to the embodiment.

Next, an input pattern determination method according to a modified example of the embodiment will be described with reference to FIGS. 9A and 9B.

Next, a functional configuration of an information processing apparatus 200 according to the second embodiment of the present invention will be described with reference to FIG. 10. Then, a partial operation of a shadow image area measuring unit 232 of the information processing apparatus 200 according to the embodiment will be described with reference to FIG. 11. Then, an example of the hardware configuration of the information processing apparatuses 100 and 200 according to the first and second embodiments of the present invention will be described with reference to FIG. 12. Lastly, the technical ideas of the embodiments will be summarized and operational effects obtained by the technical ideas will be briefly described.

(Description Items)

1: First Embodiment
  1-1: Configuration of Information Processing Apparatus 100
    1-1-1: External Appearance
    1-1-2: Functional Configuration
    1-1-3: Input Pattern Determination Method
    1-1-4: Application to Character String Manipulation Application
    1-1-5: Application to Web Application
    1-1-6: Application to Map Application
    1-1-7: (Modified Example) Input Pattern Determination Method Taking Movement into Consideration
2: Second Embodiment
  2-1: Configuration of Information Processing Apparatus 200
3: Hardware Configuration Example
4: Summary <1. First Embodiment>

The first embodiment of the present invention will be described. This embodiment is for realizing a highly convenient operating system with a plurality of operating tools (for example, a finger, a stylus, and the like) by using a touch panel that is capable of detecting pressure intensity. Additionally, in the present embodiment, a pressure-sensitive touch panel that is capable of detecting a pressure from an operating tool is assumed as the touch panel that is capable of detecting pressure intensity. Furthermore, description will be made with the assumption that the operating tool is a user's finger. Of course, the type of operating tool to which the technology of the present embodiment can be applied is not limited to such.

<1-1: Configuration of Information Processing Apparatus 100>

In the following, the configuration of the information processing apparatus 100 according to the present embodiment will be described. Additionally, the function of the information processing apparatus 100 can be realized by using a PC (Personal Computer), a mobile phone, a portable information terminal, a car navigation system, a television, a display device, a portable audio device, a portable game machine, or the like, for example. However, in the following, description will be made with a portable information terminal in mind.

(1-1-1: External Appearance)

First, an external appearance of the information processing apparatus 100 according to the present embodiment and an outline of the technology according to the present embodiment will be described with reference to FIG. 1. FIG. 1 is an explanatory diagram showing an external appearance of the information processing apparatus 100 according to the present embodiment.

As shown in FIG. 1, the information processing apparatus 100 includes a touch panel 102. This touch panel 102 is capable of detecting a position that is touched by a user using a finger (hereinafter, a touch position), and the intensity of pressure (hereinafter, pressure intensity) obtained at the time of touching. Thus, the information processing apparatus 100 can use the information on the touch position and on the pressure intensity as input information from the user. The technology according to the present embodiment aims to realize a highly convenient operating system by using these pieces of information.

Here, an operation at the time of inputting characters by using a software keyboard KEY (see FIG. 1) will be specifically considered. The software keyboard KEY is not a keyboard that is physically provided to the housing of the information processing apparatus 100, but is a keyboard, imitating a physical keyboard, displayed on a screen by software. The touch panel 102 is provided in the information processing apparatus 100, and thus, when a character key on the software keyboard KEY is touched by a finger, which character key is touched is informed to the information processing apparatus 100. Accordingly, a function same as that of a physical keyboard can be realized.

However, with the software keyboard KEY, unlike a physical keyboard, even if a key is touched, the touched portion is not pressed down. Also, when a key on a physical keyboard is pressed down, a repulsive force is received from the key, whereas, with the software keyboard KEY, a repulsive force is not received by the finger at the touched position. Accordingly, an adjacent key may often be touched by mistake at the time of input via the software keyboard KEY.

Also, when an adjacent key is touched by mistake or is simultaneously touched, the user is unlikely to notice the mistake until a wrong character is displayed on an execution screen APP. For this reason, with character input by the software keyboard KEY, errors tend to occur in a key operation, compared to character input by a physical keyboard. When an erroneous key operation is performed, the user has to correct the input character. To delete the character that is input by mistake, a backspace key (BS) or the like is used, for example.

The user touches the backspace key and deletes the wrong character, and performs character input again by touching a correct character key. There is a possibility here that the user again performs an erroneous key operation at the time of touching the backspace key. That is, as the occasion for operating a key increases, a possibility that an erroneous key operation occurs one after the other increases. To reduce such probable occurrence of erroneous operation, it is effective to reduce the number of times of touching by the finger. Also, if the number of times of touching by the finger can be reduced, the operational steps are also reduced to that extent, allowing an efficient input operation.

The correction of characters is taken as an example here, but also with other operations, there are many cases where erroneous key operations readily occur due to the use of the software keyboard KEY. For example, a key operation performed at the time of deleting a character string selected by a drag operation may be cited as an example. In this example, it is important that the state of a selected character string is correctly maintained until the character string is deleted. However, the selected range sometimes changes after a character string has been selected, due to a momentary deviation of the finger at the time of the finger being detached.

To reduce the probable occurrence of such erroneous operation, it is effective to reduce the occasions of the finger being detached. If the occasions of the finger being detached can be reduced, the number of times of touching can also be reduced, and the probable occurrence of erroneous operation can be greatly reduced. Of course, the same can be said, not only for the deletion of a selected character string, but also for operations such as copying or cutting of the selected character string, translation of the selected character string, search performed with the selected character string as the keyword, and the like, for example. Also, the same can be said, not only for the selection of a character string, but also for the operation for performing copying, cutting, enlarging, reducing or the like after selecting a partial area of an image, for example.

In view of such circumstances, the inventor of the present application has devised, by making use of the change pattern of the pressure intensity, a mechanism that enables to perform a specific operation without detaching a touching finger from the touch panel 102. By using this mechanism, it becomes possible to perform many operations without detaching the finger from the touch panel 102. Accordingly, it becomes possible to perform operations, which have been performed by repeated touching, without detaching the finger, and the number of times of touching is reduced and the operational efficiency is improved. Furthermore, since the occasion of detaching the finger is reduced, it becomes possible to stably hold the housing of the information processing apparatus 100.

However, even when using such mechanism, erroneous operations are not completely prevented. When an erroneous operation occurs, an operation for cancelling such erroneous operation becomes necessary. For example, sometimes a user moves between Web pages while browsing a Web page by using a Web browser, by pressing a link button to another Web page. At this time, if a link button to an unintended Web page is pressed by mistake, after moving to a wrong Web page, one has to move again to the original Web page by pressing a "Return" button and has to press a link button to the right Web page.

As described, to cancel an erroneous operation, many operational steps become necessary, and it is extremely inconvenient. Also, when operational steps increase, the possibility of an erroneous operation occurring during the operational steps increases. For these reasons, a mechanism for cancelling an erroneous operation with ease is desired.

Accordingly, the inventor of the present invention has devised a mechanism that enables a user to cancel an erroneous operation without detaching a finger from the touch panel 102 when the user has noticed an erroneous operation during input. By using this mechanism, a process of confirming the operation at the same time as the detachment of the finger from the touch panel 102 can be cancelled beforehand, and the operational steps for cancelling an erroneous operation can be significantly reduced. As a result, the operational efficiency is improved, and also, probable occurrence of erroneous operation is reduced.

Heretofore, the external appearance of the information processing apparatus 100 and the outline of the technology according to the present embodiment have been described. In the following, details of the technology according to the present embodiment will be described.

(1-1-2: Functional Configuration)

Figure 2:
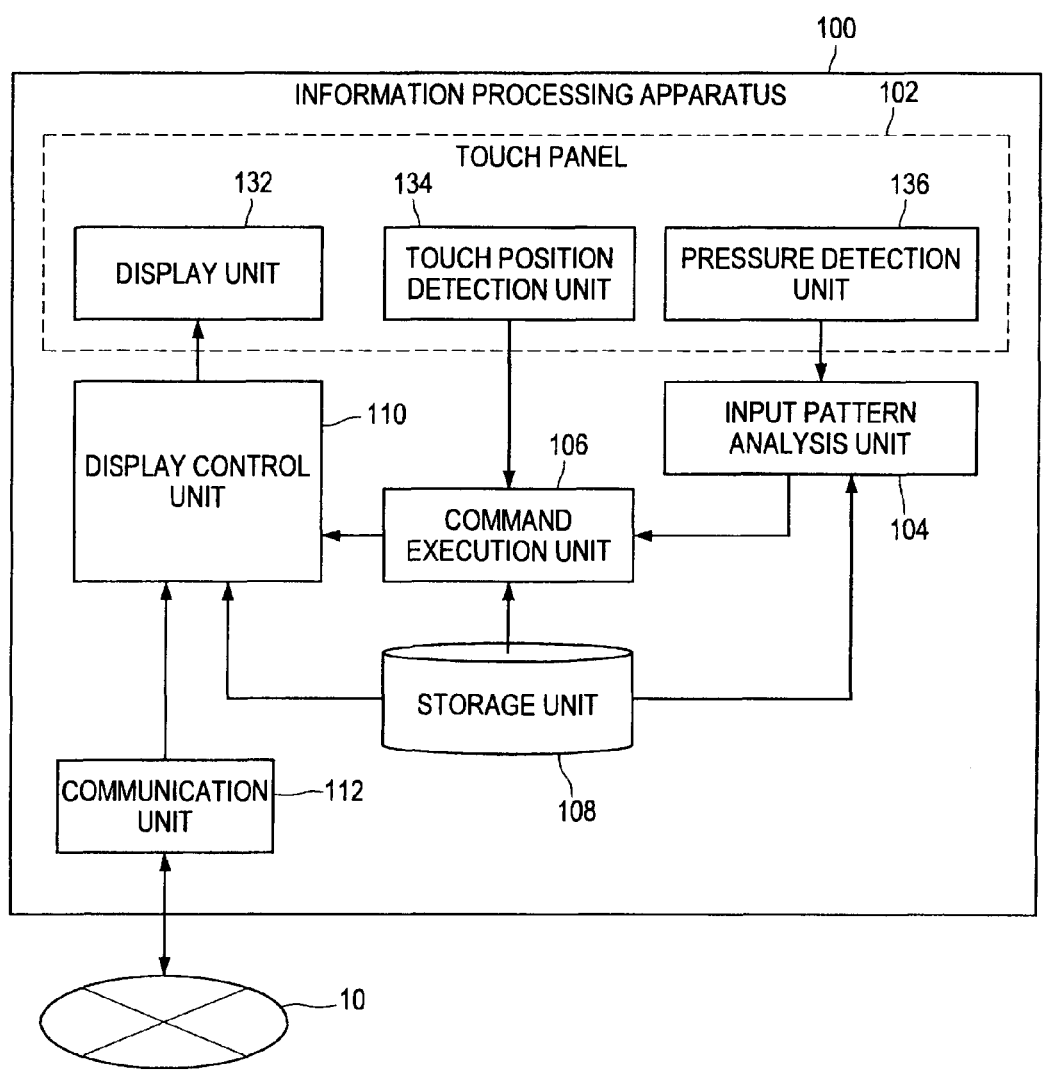
FIG. 2 is an explanatory diagram showing an example of the functional configuration of the information processing apparatus according to the embodiment.

Next, the functional configuration of the information processing apparatus 100 according to the present embodiment will be described with reference to FIG. 2. FIG. 2 is an explanatory diagram showing an example of the functional configuration of the information processing apparatus 100 according to the present embodiment. Additionally, the function of the information processing apparatus 100 illustrated in FIG. 2 can be realized by the hardware configuration illustrated in FIG. 11.

As shown in FIG. 2, the information processing apparatus 100 is configured mainly from the touch panel 102, an input pattern analysis unit 104, a command execution unit 106, a storage unit 108, a display control unit 110, and a communication unit 112. The touch panel 102 includes a display unit 132, a touch position detection unit 134, and a pressure detection unit 136.

The display unit 132 is a display device such as an LCD (Liquid Crystal Display), an ELD (Electroluminescence Display), a PDP (Plasma Display Panel), or the like, for example. Also, the touch position detection unit 134 is means for detecting the touch position. Furthermore, the pressure detection unit 136 is means for detecting the intensity of pressure (pressure intensity) at the touch position. The function of the pressure detection unit 136 is realized by a pressure measurement film, a surface pressure measurement film, or the like, for example.

First, when the touch panel 102 is touched, the touch position is detected by the touch position detection unit 134. Also, the pressure intensity at the detected touch position is detected by the pressure detection unit 136. Information on the touch position detected by the touch position detection unit 134 is input to the command execution unit 106.

Also, information on the pressure intensity detected by the pressure detection unit 136 is input to the input pattern analysis unit 104. When the information on the pressure intensity is input, the input pattern analysis unit 104 analyses the movement of the finger based on the information on the pressure intensity that has been input, and notifies the command execution unit 106 of the analysis result. Here, a normal tap operation, a slow detachment motion, a multiple press-down motion, and the like are assumed as examples of the movement of a finger.

(Normal Tap Operation)

Figure 3A:
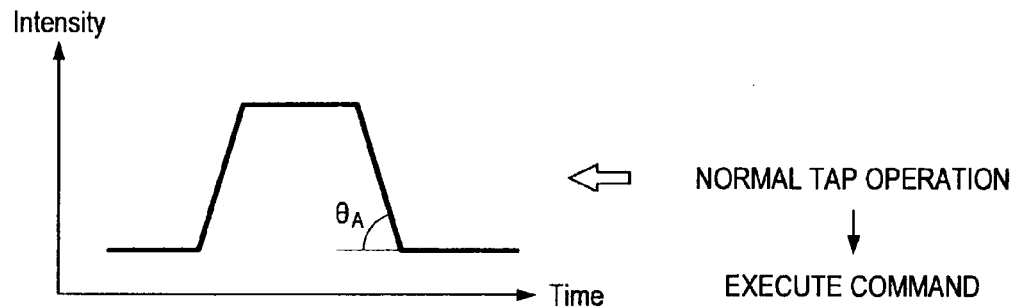
FIG. 3A is an explanatory diagram showing an input pattern determination method according to the embodiment (normal tap operation)

First, a normal tap operation will be considered. As shown in FIG. 3A, when a normal tap operation is performed, the pressure intensity is increased from the time point of a fingertip touching the touch panel 102. Also, the pressure intensity is decrease as the finger moves away from the touch panel 102, and the pressure intensity will be zero when the fingertip is completely detached. In a case of the normal tap operation, the movement of a finger moving away from the touch panel 102 is relatively fast. Thus, in a case of the normal tap operation, the rate of decrease in the pressure intensity observed at the time of the finger moving away is relatively fast.

(Slow Detachment Motion)

Next, a slow detachment motion will be considered. When a motion of slowly detaching a finger is performed, the time until the finger is completely detached from the touch panel 102 lengthens. Accordingly, in a case of the motion of slowly detaching a finger, the rate of decrease in the pressure intensity is relatively slow. The rate of decrease in the pressure intensity can be expressed by inclinations θ of the decreasing portions shown in FIGS. 3A and 3B. For example, the inclination $\theta_A$ of the decreasing portion of FIG. 3A is larger than the inclination $\theta_B$ of the decreasing portion of FIG. 3B ($\theta_A > \theta_B$).

Then, the input pattern analysis unit 104 calculates the rate of decrease in the pressure intensity based on the information on the pressure intensity input from the pressure detection unit 136. Furthermore, the input pattern analysis unit 104 determines whether the rate of decrease in the pressure intensity is a specific value or more. This specific value is determined beforehand based on the normal tap operation and the slow detachment motion performed by a user, for example. Specifically, an inclination $\theta_{th}$ (or tan $\theta_{th}$) of a specific decreasing portion that enables to distinguish between the two motions with sufficient accuracy is decided based on the change patterns of the pressure intensity obtained from the motions. The determination result by the input pattern analysis unit 104 is input to the command execution unit 106.

(Multiple Press-Down Motion)

Figure 3B:
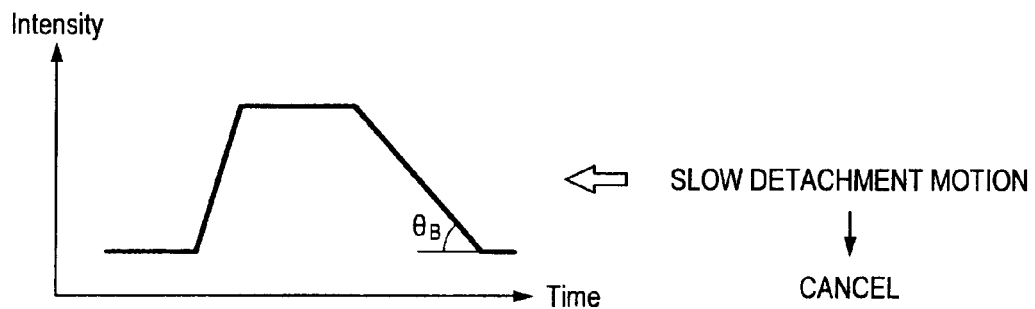
FIG. 3B is an explanatory diagram showing the input pattern determination method according to the embodiment (slow detachment motion)
Figure 3C:
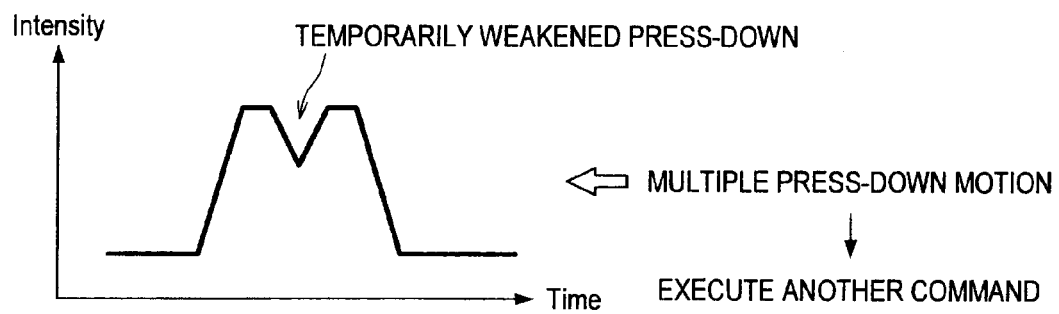
FIG. 3C is an explanatory diagram showing the input pattern determination method according to the embodiment (multiple press-down motion)

Next, a multiple press-down motion will be considered. For example, when a double press-down motion is performed, a change pattern of the pressure intensity as shown in FIG. 3C is obtained. In a case of a multiple press-down motion, there exists a section where the press-down is weakened (hereinafter, relax section). In the relax section, the pressure intensity temporarily decreases, but the finger is not completely detached from the touch panel 102. Thus, the pressure intensity will not be zero in the relax section. Also, the pressure intensity that temporarily decreased in the relax section will increase again. In a case of a multiple press-down motion, such a relax section is observed. Also, by detecting the number of the relax sections, the number of press-down times can be counted.

The relax section can be detected by monitoring whether or not the pressure intensity has fallen below a specific threshold value without becoming zero. Also, a time point of the pressure intensity falling below a specific threshold value until a time point of the pressure intensity exceeding again the specific threshold value is detected as the relax section. The specific threshold value is set to such a value that enables to distinguish with sufficient accuracy a state where the finger is pressing down and a state where the press-down is weakened, based on the change pattern obtained from a multiple press-down motion performed by a user in advance.

The input pattern analysis unit 104 performs threshold determination of the pressure intensity based on the information on the pressure intensity input from the pressure detection unit 136, counts the number of times the pressure intensity crossed the specific threshold value, and detects the number n of the relax sections. Furthermore, the input pattern analysis unit 104 calculates the number n+1 of press-downs. The number of press-down times calculated by the input pattern analysis unit 104 is input to the command execution unit 106.

As described, the analysis result by the input pattern analysis unit 104 is input to the command execution unit 106. Then, the command execution unit 106 executes specific commands assigned in advance to these analysis results (the normal tap operation, the slow detachment motion, the number of press-down times). For example, when the finger touches the character key "U" of the software keyboard KEY, the command execution unit 106 executes a command for displaying the letter "U". When this command is executed, a control signal for displaying the letter "U" on the display unit 132 is input to the display control unit 110. Then, the letter "U" is displayed on the display unit 132 by the display control unit 110. Note that the input operation of the letter "U" is not confirmed until the finger is detached from the touch panel 102.

For example, it is assumed that a command for confirming an input operation (hereinafter, confirm command) is assigned to the tap operation. In this case, when an analysis result (the tap operation) is input from the input pattern analysis unit 104 to the command execution unit 106, the confirm command is executed by the command execution unit 106, and the input operation of the letter "U" is confirmed. Furthermore, it is assumed that a command for cancelling an input operation (hereinafter, cancel command) is assigned to the slow detachment motion. In this case, when an analysis result (the slow detachment motion) is input from the input pattern analysis unit 104, the cancel command is executed by the command execution unit 106, and the input operation of the letter "U" is cancelled.

Furthermore, it is assumed that a command for enlarging the font size by two times (hereinafter, enlargement command) is assigned to a double press-down motion. In this case, when an analysis result (number of press-down times=2) is input from the input pattern analysis unit 104 to the command execution unit 106, the enlargement command is executed by the command execution unit 106, and the size of the letter "U" is enlarged by two times. Furthermore, it is assumed that a command for showing a character as a subscript (hereinafter, subscript command) is assigned to a triple press-down motion. In this case, when an analysis result (number of press-down times=3) is input from the input pattern analysis unit 104 to the command execution unit 106, the subscript command is executed by the command execution unit 106, and the letter "U" is changed into a subscript.

Additionally, information on the touch position is input from the touch position detection unit 134 to the command execution unit 106, and a command to be executed is changed as appropriate in accordance with the information on the touch position as well as with the type of the operation object displayed on the display unit 132 or the like. Furthermore, the type of command assigned to the slow detachment motion or the number of press-down times is not limited to the examples described above. Also, the correspondence relationship between each motion and the command is registered in advance in a database stored in the storage unit 108. The command execution unit 106 refers to the database stored in the storage unit 108, and determines a command to be executed according to the analysis result by the input pattern analysis unit 104.

When a command is executed by the command execution unit 106, information on the update of display content consequent on the execution of the command is input to the display control unit 110. When the update information is input, the display control unit 110 makes the display unit 132 display the display content after update based on the update information. Furthermore, in a case the execution content of the command is related to a Web page, the display control unit 110 acquires necessary information such as the Web page via the communication unit 112. Then, the display control unit 110 makes the display unit 132 display the acquired information.

Furthermore, the display control unit 110 manages a window to be displayed on the display unit 132. For example, in a case a generation command for a new window is executed by the command execution unit 106, the display control unit 110 generates a new window on the display unit 132. Also, in a case a delete command for a window is executed by the command execution unit 106, the display control unit 110 deletes the window displayed on the display unit 132. Furthermore, the display control unit 110 will have the software keyboard KEY displayed, or various operation objects displayed. Furthermore, the display control unit 110 reproduces content stored in the storage unit 108, and make the display unit 132 display the reproduced content.

Heretofore, the functional configuration of the information processing apparatus 100 according to the present embodiment has been described.

(1-1-3: Input Pattern Determination Method)

Next, an input pattern determination method according to the present embodiment will be described in greater detail with reference to FIGS. 3A to 3C. FIGS. 3A to 3C are explanatory diagrams showing the input pattern determination method according to the present embodiment. The input pattern here means the form of a graph indicating the change over time in the pressure intensity.

As has been described, when the normal tap operation is performed, an input pattern of the pressure intensity as shown in FIG. 3A is obtained (hereinafter, pattern A). Also, when the slow detachment motion is performed, an input pattern of the pressure intensity as shown in FIG. 3B is obtained (hereinafter, pattern B). When comparing pattern A and pattern B, it can be seen that the inclinations θ of the decreasing portions are different.

Specifically, the inclination $O_A$ of pattern A is larger than the inclination $\theta_B$ of pattern B. That is, it can be seen that the rate of decrease in the pressure intensity is larger for pattern A, and that the finger is detached from the touch panel 102 in a shorter time for pattern A. On the other hand, it can be seen that, with pattern B, the finger is detached from the touch panel 102 taking a relatively long time. As described, by comparing the input patterns, the normal tap operation and the slow detachment motion can be distinguished from each other.

Furthermore, when the double press-down motion is performed, an input pattern of the pressure intensity as shown in FIG. 3C is obtained (hereinafter, pattern C). Pattern C includes a section where the press-down is temporarily weakened (relax section). Also, there exist two sections with large pressure intensities with the relax section in between. The sections with large pressure intensities indicate the press-down motions. That is, it can be seen from pattern C that the number of press-down times is two. Additionally, in a case the number of press-down times is N, N−1 relax sections will appear in pattern C. As described, the number of press-down times can be counted by detecting the relax section included in the input pattern.

Heretofore, the input pattern determination method according to the present embodiment has been described.

(1-1-4: Application to Character String Manipulation Application)

Next, application to a character string manipulation will be described with reference to FIGS. 4A, 4B and 5.

(Normal Tap Operation: Input Operation Confirmation)

First, reference will be made to FIG. 4A. A case of inputting a letter "g" by the normal tap operation is shown in FIG. 4A. In a case of inputting a letter "g", a user taps on the character key "G" of the software keyboard KEY. In the normal tap operation, the finger that touched the character key "G" is immediately detached from the touch panel 102. When the finger is detached from the touch panel 102, the input operation is confirmed, and a letter "g" is displayed on the display screen in a confirmed manner.

(Slow Detachment Motion: Input Operation Cancellation)

Next, reference will be made to FIG. 4B. A case of cancelling the input operation of a letter "g" by the slow detachment motion is shown in FIG. 4B. In a case of inputting a letter "g", a user taps on the character key "G" of the software keyboard KEY. In the normal tap operation, the finger that touched the character key "G" is immediately detached from the touch panel 102. Accordingly, even if the user realises that he/she has touched a wrong character key by mistake, if the finger is detached from the touch panel 102, the input operation is confirmed, and the letter "g" is displayed on the display screen in a confirmed manner.

However, in the present embodiment, if the user notices an erroneous input operation after touching the touch panel 102 with the finger to input the letter "g", the user can cancel the input operation by slowly detaching the finger. As shown in FIG. 4B, if the finger is detached slowly, the input operation of the letter "g" is cancelled, and the letter "g" is not displayed on the display screen. That is, the state before the input operation is restored. Additionally, the letter "g" may be displayed, while not yet confirmed, at the time point of the finger touching the touch panel 102. If an unconfirmed character is displayed on the display screen, it will be easier for the user to notice the erroneous operation.

(Operational Flow of Information Processing Apparatus 100)

Next, a processing flow performed by the information processing apparatus 100 so as to realize the character string manipulation of FIGS. 4A and 4B will be described with reference to FIG. 5. FIG. 5 is an explanatory diagram showing an example of the operational flow of the information processing apparatus 100.

Figure 5:
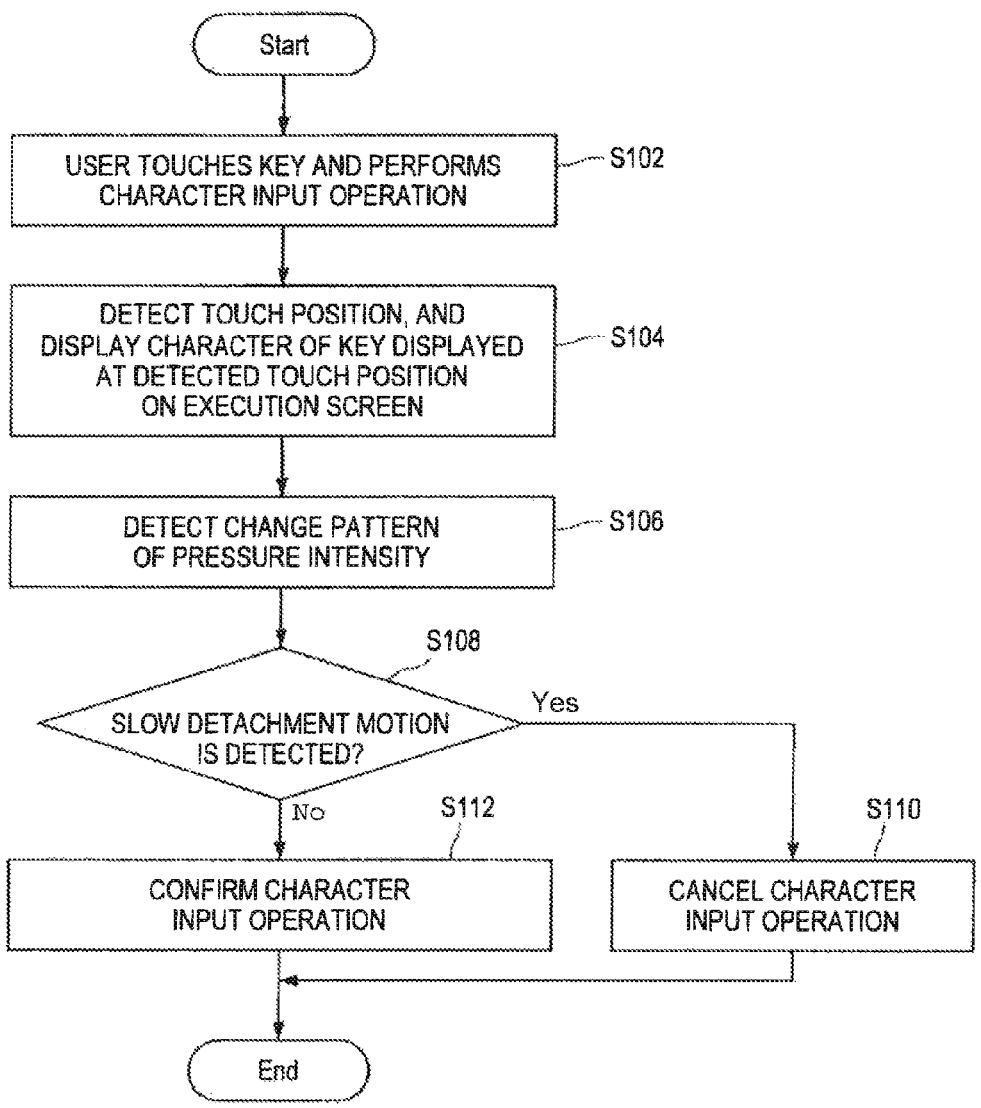
FIG. 5 is an explanatory diagram showing an example of an operational flow of the information processing apparatus according to the embodiment.

As shown in FIG. 5, first, when a user performs an input operation of a character by touching a character key of the software keyboard KEY (S102), the information processing apparatus 100 detects the touch position and displays on the screen the character of the character key displayed on the detected touch position (S104). Note that the character displayed on the screen here is displayed in an unconfirmed state. Then, the information processing apparatus 100 detects the change pattern of the pressure intensity at the touch position (input pattern) (S106). Then, the information processing apparatus 100 attempts to detect the slow detachment motion based on the change pattern of the pressure intensity (S108).

In a case the slow detachment motion is detected, the information processing apparatus 100 proceeds to the process of step S110. On the other hand, in a case the slow detachment motion is not detected, the information processing apparatus 100 proceeds to the process of step S112. In a case it proceeded to the process of step S110, the information processing apparatus 100 cancels the input operation of the character (S110), and ends the series of processes relating to the input operation of step S102. On the other hand, in a case it proceeded to the process of step S112, the information processing apparatus 100 confirms the input operation of the character, and ends the series of processes relating to the input operation of step S102.

Heretofore, application to the character input operation has been described.

(1-1-5: Application to Web Application)

Next, application to a Web application will be described with reference to FIGS. 6A, 6B, 6C, and 7.

(Normal Tap Operation: Move to Link Destination)

First, reference will be made to FIG. 6A. A case of moving to the Web site of a link destination by the normal tap operation is shown in FIG. 6A. In a case of moving to the Web site of a link destination, a user taps on a link object on a Web page. In the normal tap operation, the finger that touched the link object is immediately detached from the touch panel 102. When the finger is detached from the touch panel 102, the Web page of the link destination is displayed.

(Slow Detachment Motion: Cancel Moving to Link Destination)

Next, reference will be made to FIG. 6B. A case of cancelling, by the slow detachment motion, an operation of moving to the Web site of a link destination is shown in FIG. 6B. In a case of moving to the Web site of a link destination, a user taps on a link object on a Web page. In the normal tap operation, the finger that touched the link object is immediately detached from the touch panel 102. Therefore, even if the user realizes that he/she has touched a wrong link object by mistake, the Web page of the link destination will be displayed at the time point of the finger detaching from the touch panel 102.

However, according to the present embodiment, in a case the user touches the touch panel 102 with a finger to move to the Web site of a link destination and then realizes that the link destination is wrong, the user can cancel the operation of moving to the link destination by slowly detaching the finger. As shown in FIG. 6B, when the finger is detached slowly, the operation of moving to the link destination is cancelled, and the original Web page is kept displayed. Thus, the user does not have to wait until the Web page of an undesired link destination is displayed, or to perform an operation of returning from the Web page to the original Web page.

(Multiple Press-Down Motion: Display Link Destination on Separate Window)

Next, reference will be made to FIG. 6C. A case of displaying the Web page of a link destination on a separate window by a multiple press-down motion is shown in FIG. 6C.

In the example of FIG. 6A, the Web page of a link destination was displayed on the same window. If the original Web page is updated to the Web page of a link destination in this manner, it becomes necessary, at the time of moving to another link destination, to return to the original Web page or to display again the Web page of the link destination. Furthermore, if a menu for displaying the Web page of a link destination on a separate window is displayed, the operational steps will increase, and thus the operational efficiency will decrease and also erroneous operations will be more likely to occur.

Accordingly, as shown in FIG. 6C, if a function for displaying a link destination on a separate window is assigned to the multiple press-down motion, a function for generating a separate window and a function for displaying a link destination on the window can be realized without detaching the finger from the touch panel 102.

Also, since the number of press-down times can be counted, a window for displaying the Web page of a link destination can be automatically selected according to the number of press-down times, for example. Also, in a case where a double press-down operation is performed on a link object in a state where there is a window generated by the double press-down motion, the display of the window may be updated to the Web page of the link destination. According to such configuration, an operation of selecting a window can be performed without detaching the finger from the touch panel 102.

(Operational Flow of Information Processing Apparatus 100)

Next, the operational flow of the information processing apparatus 100 for realizing the operation of moving to link destinations illustrated in FIGS. 6A to 6C will be described with reference to FIG. 7.

As shown in FIG. 7, first, a link button (a link object) is touched by a user (S132). When the link button is touched, the information processing apparatus 100 detects the touch position, and acquires the Web page of a link destination displayed on the detected touch position (S134). Then, the information processing apparatus 100 detects the change pattern of the pressure intensity (S136). Then, the information processing apparatus 100 attempts the detection of the slow detachment motion from the detected change pattern of the pressure intensity (S138). In a case the slow detachment motion is detected, the information processing apparatus 100 proceeds to the process of step S140. On the other hand, in a case the slow detachment motion is not detected, the information processing apparatus 100 proceeds to the process of step S142.

In a case it proceeded to the process of step S140, the information processing apparatus 100 cancels the operation of moving to the Web site of the link destination, and ends the series of processes. In a case it proceeded to the process of step S142, the information processing apparatus 100 attempts the detection of the multiple press-down motion (S142). In a case the multiple press-down motion is detected, the information processing apparatus 100 proceeds to the process of step S144. On the other hand, in a case the multiple press-down motion is not detected, the information processing apparatus 100 proceeds to the process of step S146.

In a case it proceeded to the process of step S144, the information processing apparatus 100 generates a separate window, and displays the Web page of a link destination on the generated separate window (S144). Then, when the Web page of the link destination is displayed on the separate window, the information processing apparatus 100 ends the series of processes. On the other hand, in a case it proceeded to the process of step S146, the information processing apparatus 100 displays the Web page of a link destination on the same window on which the link button is displayed (S146), and ends the series of processes.

Heretofore, application to the Web application has been described.

(1-1-6: Application to Map Application)

Next, application to a map application will be described with reference to FIG. 8. An example of application to a map application capable of displaying an image after enlarging or reducing the same is shown in FIG. 8. Additionally, a map application is taken as an example here, but the technology of the present embodiment can also be applied to an imaging application capable of displaying an image after enlarging or reducing the same.

In the example of FIG. 8, an enlargement command is assigned to the multiple press-down motion. Also, a cancel command for an enlargement operation is assigned to the slow detachment motion. As shown in FIG. 8, when a single press-down motion is performed by a user, an image is enlarged by one stage. At this time, if the user detaches the finger slowly, the enlargement operation is cancelled and the image returns to the image before enlargement.

Similarly, when a double press-down motion is performed by the user, the image is enlarged by two stages. At this time, if the user detaches the finger slowly, the enlargement operation is cancelled and the image returns to the image before enlargement. As described, the image is displayed being enlarged at a different magnification according to the number of press-down times. Also, if the slow detachment motion is performed at the time of detaching the finger, the enlargement operation is cancelled. Of course, if the finger is detached quickly as with the normal tap operation, the enlargement operation is confirmed and the image after enlargement is maintained.

According to such configuration, an image can be enlarged at a desired magnification without detaching the finger from the touch panel 102. Furthermore, also in a case where the enlargement operation is desired to be cancelled, the cancel operation is enabled without detaching the finger from the touch panel 102.

As described above, this cancel operation can be performed successively after the enlargement operation without detaching the finger from the touch panel 102. Particularly, since it is possible to perform the cancel operation without operating the operation object for cancellation or displaying a menu, the operational steps can be reduced to minimum, and the operational efficiency can be maximized and erroneous operations can be suppressed as much as possible.

Additionally, an example of returning to the image before enlargement by the cancel operation is illustrated here, but it is also possible to have an image of the immediately preceding stage displayed by the cancel operation.

(1-1-7: (Modified Example) Input Pattern Determination Method Taking Movement into Consideration)

Next, as a modified example of the present embodiment, an input pattern determination method that takes the movement of the finger into consideration will be described with reference to FIGS. 9A and 9B. As has been described, the information processing apparatus 100 according to the present embodiment is capable of detecting the touch position in real-time by the touch position detection unit 134. Accordingly, by monitoring the change over time in the touch position, the movement of the finger and the movement trail can be detected. Thus, a case will be considered where the moving state of the finger and the motion of the finger are combined and different commands are assigned to different combinations.

(Combination of Slow Detachment Motion and Moving State)

Figure 9A:
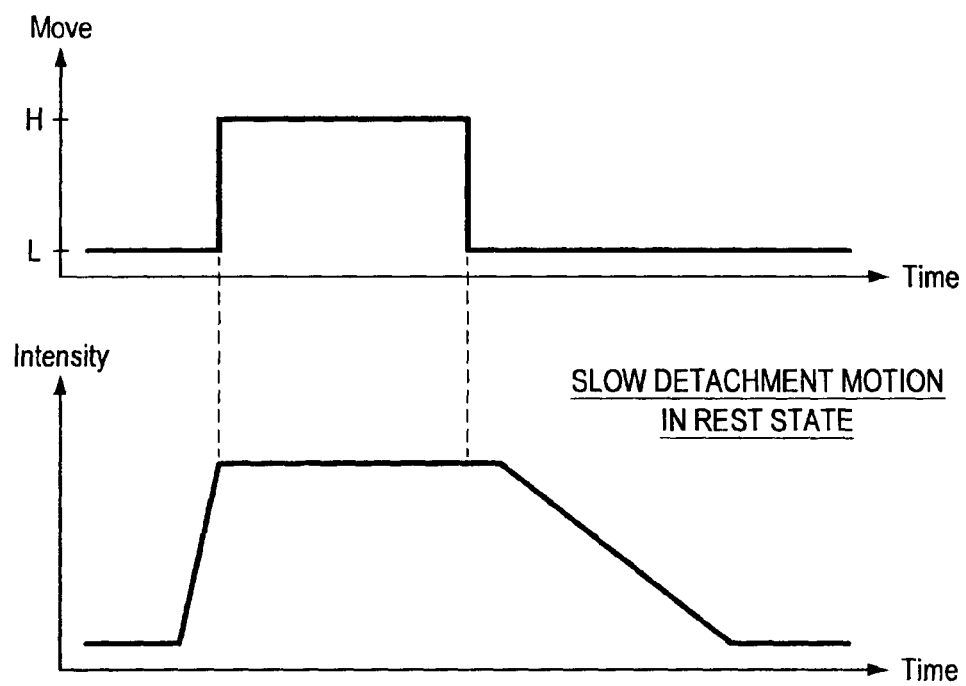
FIG. 9A is an explanatory diagram showing an input pattern determination method according to a modified example of the embodiment (slow detachment motion)
Figure 9B:
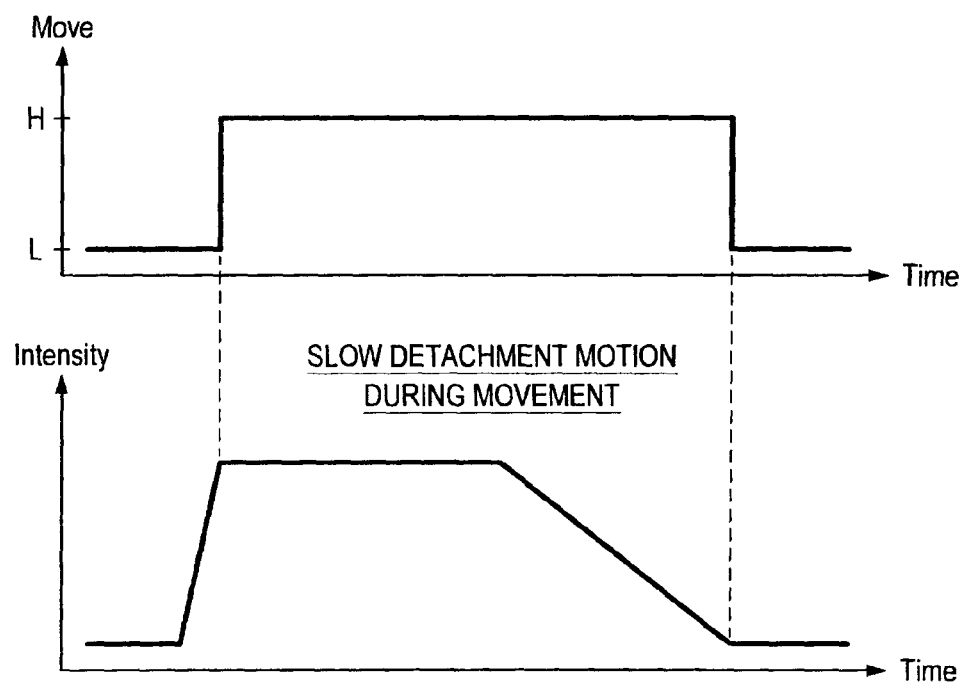
FIG. 9B is an explanatory diagram showing an input pattern determination method according to a modified example of the embodiment (slow detachment motion)

FIG. 9A is a graph obtained in a case the finger is slowly detached from the touch panel 102 after moving a specific distance. The upper half of FIG. 9A is a graph showing the moving state of the finger that changes with time. Here, H indicates the moving state, and L indicates a rest state (including a subtly-moving state). Furthermore, the lower half of FIG. 9A is a graph showing the pressure intensity that changes with time.

The slow detachment motion is usually performed in the rest state. Furthermore, operations performed in the moving state are in many cases treated as a series of operations. As an operation performed during the movement of the finger, there is an operation of selecting a character string or an image range, for example. This selection operation puts information of the range specified during the movement of the finger into a selected state. In a case the cancel command is assigned to the slow detachment motion, the selection operation is cancelled when the slow detachment motion is performed. According to such configuration, the cancel operation of the selected range can be performed without detaching the finger from the touch panel 102, and thus the operational efficiency is significantly improved.

Note that, as shown in FIG. 9A, a modification is made here in such a way that the cancel command is executed in a case the slow detachment motion is performed after the finger has come to rest. That is, the input pattern analysis unit 104 detects the moving state of the finger based on the change in the touch position, and makes the command execution unit 106 execute the cancel command in a case the finger is slowly detached while at rest. The analysis of the touch position by the input pattern analysis unit 104 is not taken into consideration in the examples of FIGS. 3A to 3C, but in the present case, the input pattern analysis unit 104 analyses the change over time in the touch position, and by using the analysis result and an analysis result relating to the pressure intensity, makes the command execution unit 106 execute the cancel command. According to such configuration, a command other than the cancel command can be assigned to a slow detachment motion during movement (see FIG. 9B).

For example, application to a drawing application will be considered. For example, the following commands can be assigned to operations performed at the time of drawing a line.

(1) "Rest state+quickly detaching motion" is assigned with a command for confirming a drawn line. That is, when the finger drawing a line is stopped and is quickly detached, the drawn line is maintained as displayed.

(2) "Rest state+slow detachment motion" is assigned with the cancel command. That is, when the finger drawing a line is stopped and is slowly detached, the drawn line is erased.

(3) "Moving state+slow detachment motion" is assigned with a command for smoothing a line. That is, when the finger is slowly detached while drawing a line, the drawn line is changed into a smooth line and is displayed.

According to such configuration, two different commands can be assigned to the same slow detachment motion. As a result, the types of command that can be executed without detaching the finger from the touch panel 102 increase, and the operational efficiency can be further improved. Additionally, according to the configuration above, even if the types of command that can be executed increase, there will not be a touch operation for switching between the commands. That is, the operational efficiency is not decreased due to the increase in the operational steps.

Heretofore, the first embodiment of the present invention has been described.

<2: Second Embodiment>

Next, the second embodiment of the present invention will be described. The main difference between the present embodiment and the first embodiment described above lies in the configuration of the touch panel. In the first embodiment described above, the pressure detection unit 136 for detecting the intensity of a pressure was provided as means for detecting the pressure intensity. However, the pressure intensity can be detected without actually measuring the pressure.

For example, the pressure intensity can also be obtained by using an optical touch panel configured from a light source (for example, a back light or the like) provided within the display screen and an optical sensor. The present embodiment uses such optical touch panel.

<2-1: Configuration of Information Processing Apparatus 200>

First, the functional configuration of an information processing apparatus 200 according to the present embodiment will be described with reference to FIG. 10. FIG. 10 is an explanatory diagram showing an example of the functional configuration of the information processing apparatus 200 according to the present embodiment. Additionally, the functions of the information processing apparatus 200 illustrated in FIG. 10 can be realized by the hardware configuration shown in FIG. 12. Furthermore, structural elements that have substantially the same functions as those of the information processing apparatus 100 according to the first embodiment described above are denoted with the same reference numerals, and repeated explanation of these structural elements is omitted.

Figure 10:
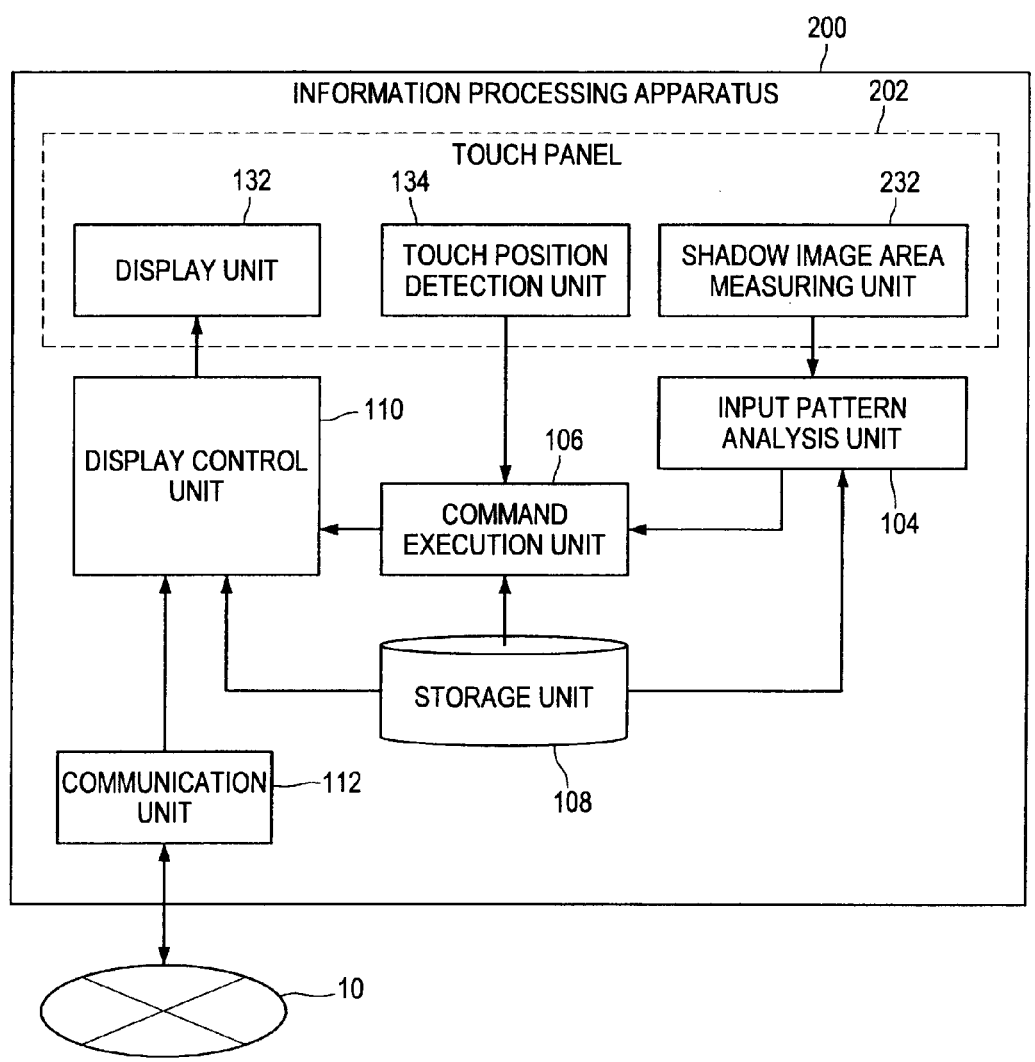
FIG. 10 is an explanatory diagram showing an example of the functional configuration of an information processing apparatus according to a second embodiment of the present invention.

As shown in FIG. 10, the information processing apparatus 200 is mainly configured from a touch panel 202, the input pattern analysis unit 104, the command execution unit 106, the storage unit 108, the display control unit 110, and the communication unit 112. The difference with the information processing apparatus 100 according to the first embodiment described above lies mainly in the configuration of the touch panel 202. Thus, an explanation will be given mainly on the configuration of the touch panel 202.

As shown in FIG. 10, the touch panel 202 includes the display unit 132, the touch position detection unit 134, and a shadow image area measuring unit 232. Pressure intensity detection means of the touch panel 202 is the shadow image area measuring unit 232. The touch panel 202 is an optical touch panel. Here, it is assumed that a light source for emitting light from within the display screen and an optical sensor for detecting light entering from the surface of the display screen are included in the touch panel 202.

When a finger is touching the display screen, a part of the light emitted from the light source is reflected by the finger and enters the optical sensor. Also, light not reflected by the finger is not received by the optical sensor. Thus, by forming an image from the distribution of light that entered the optical sensor, the shape of the finger pressing the surface of the touch panel 202 is obtained as an image.

Figure 11:
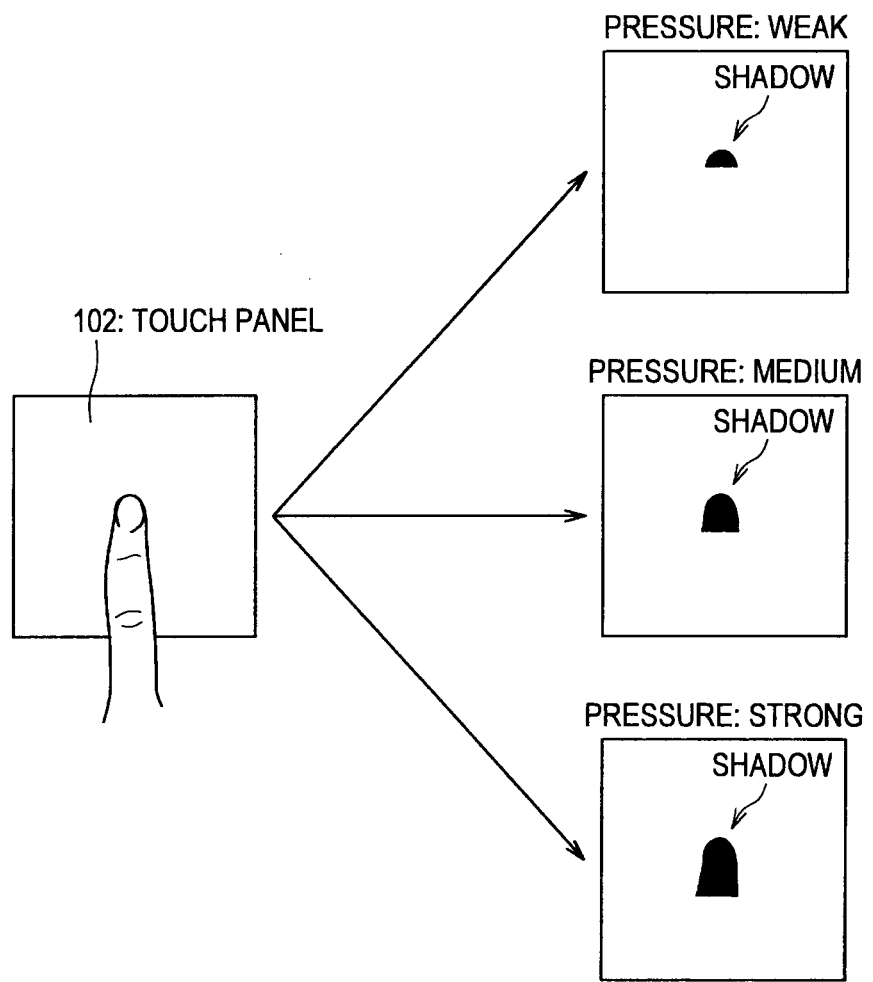
FIG. 11 is an explanatory diagram showing a partial operation of a shadow image area measuring unit included in the information processing apparatus according to the embodiment.

For example, when a portion where the intensity of the reflected light is strong is expressed as a shadow, image patterns as shown in FIG. 11 are obtained. A small shadow is obtained for a portion that is pressed weakly, and as the pressure grows, a larger part of the finger is pressed against the touch panel 202, and thus the area of the shadow gradually becomes larger. Therefore, the pressure intensity at each touch position can be detected by measuring the area of the shadow.

Accordingly, the touch position detection unit 134 detects a position where a shadow is obtained as the touch position, and inputs the detection result to the input pattern analysis unit 104. Also, the shadow image area measuring unit 232 acquires the area of each shadow, and inputs the size of the area to the input pattern analysis unit 104 as information on the pressure intensity. As described, information on the touch position and information on the pressure intensity are input to the input pattern analysis unit 104. Accordingly, matching between an input pattern and a registered pattern can be performed in the same manner as the first embodiment described above. Additionally, processes subsequent to the process by the input pattern analysis unit 104 are the same as those of the first embodiment, and description thereof is omitted.

Heretofore, the second embodiment of the present invention has been described.

<3: Hardware Configuration Example>

Figure 12:
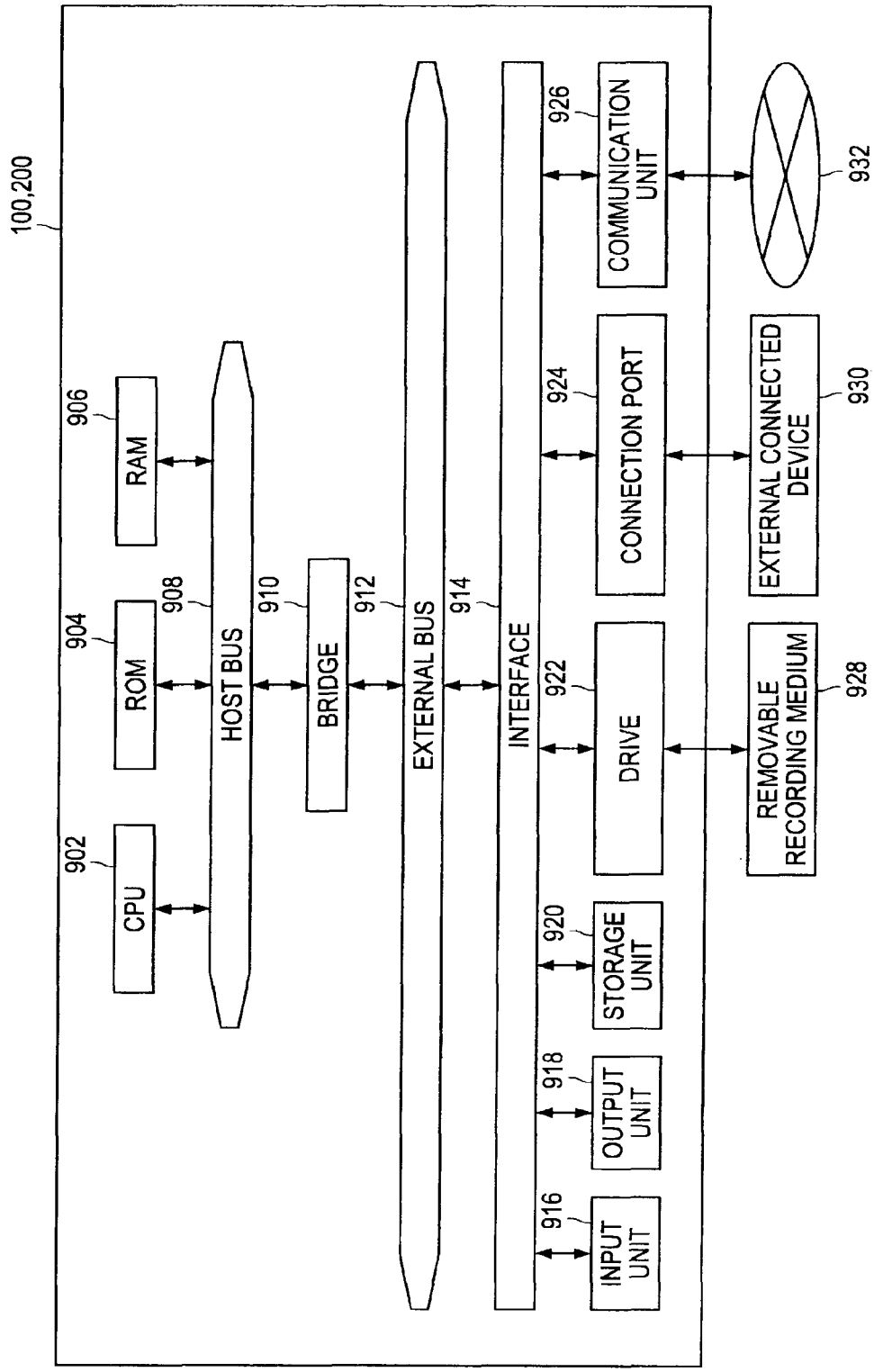
FIG. 12 is an explanatory diagram showing an example of the hardware configuration of the information processing apparatus according to each embodiment of the present invention.

The function of each structural element of the information processing apparatuses 100 and 200 described above can be realized by using the hardware configuration of an information processing apparatus shown in FIG. 12, for example. That is, the function of each structural element is realized by controlling the hardware shown in FIG. 12 by using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 12, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<4: Summary>

Lastly, the technical contents according to the first and second embodiments of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus includes a pressure intensity detection unit that detects pressure intensity of an operating tool pressing a screen, a change rate detection unit that detects a rate of change of the pressure intensity based on information on the pressure intensity detected by the pressure intensity detection unit, and a function providing unit that provides a specific function in a case the rate of change of the pressure intensity detected by the change rate detection unit is high, and cancels an operation by the operating tool without providing the specific function in a case the rate of change of the pressure intensity is low.

As described, the information processing apparatus according to the present embodiment is capable of detecting an pressure intensity, of detecting the rate of change of the detected pressure intensity, and of providing or cancelling the provision of a specific function depending on the magnitude of the rate of change. According to such configuration, an operation that a user tried to perform by pressing an operating tool against a screen is confirmed when the user quickly detaches the operating tool, and a function corresponding to the operation is provided. On the other hand, when the user slowly detaches the operating tool, the operation that the user tried to perform by pressing the operating tool against the screen can be cancelled.

Therefore, the user can realize a cancellation operation without detaching the operating tool pressed against the screen from the screen. That is, a touch operation for switching between the confirmation and the cancellation of an operation becomes unnecessary, and the operational steps performed at the time of performing the cancellation operation can be reduced. In this manner, since the operational steps are reduced, the operational efficiency is significantly improved. Also, since the operational steps are reduced, probable occurrence of erroneous operations is reduced, and since the occasion for performing an operation for correcting an erroneous operation is reduced, further improvement of the operational efficiency can be expected.

(Notes)

The pressure detection unit 136 and the shadow image area measuring unit 232 described above are examples of the pressure intensity detection unit. The input pattern analysis unit 104 described above is an example of the change rate detection unit. The input pattern analysis unit 104 and the command execution unit 106 described above are examples of the function providing unit. The input pattern analysis unit 104 described above is an example of an increase/decrease counter. The touch position detection unit 134 described above is an example of a position detection unit. The input pattern analysis unit 104 is an example of a movement detection unit. The pressure detection unit 136 is an example of a pressure sensor.

It should be understood by those skilled in the art that various modifications, combinations, sub-combinations and alterations may occur depending on design requirements and other factors insofar as they are within the scope of the appended claims or the equivalents thereof.

In the description above, although an example has been illustrated where the cancel command is assigned to the slow detachment motion, it is also possible to assign another command thereto.

When taking an application capable of processing a character string as an example, the other command may be, for example, a delete command for the character string, a copy command, a cut command, a typeface change command, a Web search command with the character string as a keyword, and a translation command for the character string.

Also, when taking an application capable of processing an image as an example, the other command may be, for example, a delete command for the image, a copy command, a cut command, a command for uploading to a server, and a command for attaching to an email. As such, various modifications are possible, and these modifications are, of course, within the technical scope of the present embodiment.

The present application contains subject matter related to that disclosed in Japanese Priority Patent Application JP 2009-198472 filed in the Japan Patent Office on Aug. 28, 2009, the entire content of which is hereby incorporated by reference.

What is claimed is:

1. An information processing apparatus comprising:
   a pressure intensity detection unit that detects pressure intensity of an operating tool pressing a screen;
   a change rate detection unit that detects a rate of change of the pressure intensity based on information on the pressure intensity detected by the pressure intensity detection unit;
   an input pattern analysis unit that determines whether the rate of change of the pressure intensity is more than a threshold value, the threshold value being determined based on a pressure intensity change pattern of a previous operating tool operation;
   a function providing unit that provides a specific function in a case the rate of change of the pressure intensity detected by the change rate detection unit is more than the threshold value, and cancels an operation by the operating tool without providing the specific function in a case the rate of change of the pressure intensity is not more than the threshold value; and an increase/decrease counter that counts, in a case the pressure intensity detected by the pressure intensity detection unit does not become zero, the number of times the pressure intensity drops below and then rises above a second threshold value, wherein the function providing unit provides the specific function that is different depending on the number of times the pressure intensity drops below and then rises above the second threshold value.

2. The information processing apparatus according to claim 1, wherein, when an update operation on display content of a first window displayed within the screen is performed by the operating tool, the function providing unit updates the display content of the first window in a case the rate of change of the pressure intensity detected by the change rate detection unit is more than the first threshold value and the number of times counted by the increase/decrease counter is a first specific number, displays display content after update on a second window different from the first window in a case the rate of change of the pressure intensity detected by the change rate detection unit is more than the first threshold value and the number of times counted by the increase/decrease counter is a second specific number, and cancels the update operation on the display content of the first window in a case the rate of change of the pressure intensity detected by the change rate detection unit is not more than the first threshold value.

3. The information processing apparatus according to claim 1, wherein the function providing unit enlarges and displays an image that is an enlargement target at a magnification that is different depending on the number of times counted by the increase/decrease counter, in a case the rate of change of the pressure intensity detected by the change rate detection unit is more than the first threshold value, and cancels an enlargement operation on the image that is an enlargement target in a case the rate of change of the pressure intensity detected by the change rate detection unit is not more than the first threshold value.

4. The information processing apparatus according to claim 1, further comprising:

a position detection unit that detects a position of the operating tool pressing the screen; and a movement detection unit that detects a movement of the operating tool based on information on the position detected by the position detection unit, wherein, when selection of a character string is performed by the movement of the operating tool, the function providing unit performs processing regarding the character string selected during the movement of the operating tool, in a case the rate of change of the pressure intensity detected by the change rate detection unit is more than the first threshold value after detection of a rest state or a near-rest state of the operating tool by the movement detection unit, and cancels a processing operation regarding the character string selected during the movement of the operating tool in a case the rate of change of the pressure intensity detected by the change rate detection unit is not more than the first threshold value after the detection of the rest state or the near-rest state of the operating tool.

5. An information processing method comprising:

detecting pressure intensity of an operating tool pressing a screen;

detecting a rate of change of the pressure intensity based on information on the detected pressure intensity;

determining whether the rate of change of the pressure intensity is more than a threshold value, the threshold value being determined based on a pressure intensity change pattern of a previous operating tool operation;

providing a specific function in a case the rate of change of the detected pressure intensity is more than the threshold value, and canceling an operation by the operating tool without providing the specific function in a case the rate of change of the pressure intensity is not more than the threshold value; and counting, in a case the detected pressure intensity does not become zero, the number of times the pressure intensity drops below and then rises above a second threshold value, wherein the specific function is provided to be different depending on the number of times the pressure intensity drops below and then rises above the second threshold value.

6. The information processing method according to claim 5, further comprising:

performing, when an update operation on display content of a first window displayed within the screen is performed by the operating tool:

an updating of the display content of the first window in a case the rate of change of the detected pressure intensity is more than the first threshold value and the counted number of times is a first specific number;

a displaying of display content after update on a second window different from the first window in a case the rate of change of the detected pressure intensity is more than the first threshold value and the counted number of times is a second specific number; and a canceling of the update operation on the display content of the first window in a case the rate of change of the detected pressure intensity is not more than the first threshold value.

7. The information processing method according to claim 5, further comprising:

enlarging and displaying an image that is an enlargement target at a magnification that is different depending on the counted number of times, in a case the rate of change of the detected pressure intensity is more than the first threshold value, and canceling an enlargement operation on the image that is an enlargement target in a case the rate of change of the detected pressure intensity is not more than the first threshold value.

8. The information processing method according to claim 5, further comprising:

detecting a position of the operating tool pressing the screen;

detecting a movement of the operating tool based on information on the detected position; and performing, when selection of a character string is performed by the movement of the operating tool:

a processing regarding the character string selected during the movement of the operating tool, in a case the rate of change of the detected pressure intensity is more than the first threshold value after detection of a rest state or a near-rest state of the operating tool, and a canceling of a processing operation regarding the character string selected during the movement of the operating tool in a case the rate of change of the detected pressure intensity is not more than the first threshold value after the detection of the rest state or the near-rest state of the operating tool.

9. A non-transitory computer-readable medium having embodied thereon a program, which when executed by a computer causes the computer to execute an information processing method, the method comprising:

detecting pressure intensity of an operating tool pressing a screen;

detecting a rate of change of the pressure intensity based on information on the detected pressure intensity;

determining whether the rate of change of the pressure intensity is more than a threshold value, the threshold value being determined based on a pressure intensity change pattern of a previous operating tool operation;

providing a specific function in a case the rate of change of the detected pressure intensity is more than the threshold value, and canceling an operation by the operating tool without providing the specific function in a case the rate of change of the pressure intensity is not more than the threshold value; and counting, in a case the detected pressure intensity does not become zero, the number of times the pressure intensity drops below and then rises above a second threshold value, wherein the specific function is provided to be different depending on the number of times the pressure intensity drops below and then rises above the second threshold value.

10. The non-transitory computer-readable medium according to claim 9, wherein the method further comprises:

performing, when an update operation on display content of a first window displayed within the screen is performed by the operating tool:

an updating of the display content of the first window in a case the rate of change of the detected pressure intensity is more than the first threshold value and the counted number of times is a first specific number;

a displaying of display content after update on a second window different from the first window in a case the rate of change of the detected pressure intensity is more than the first threshold value and the counted number of times is a second specific number; and a canceling of the update operation on the display content of the first window in a case the rate of change of the detected pressure intensity is not more than the first threshold value.

11. The non-transitory computer-readable medium according to claim 9, wherein the method further comprises:

enlarging and displaying an image that is an enlargement target at a magnification that is different depending on the counted number of times, in a case the rate of change of the detected pressure intensity is more than the first threshold value, and canceling an enlargement operation on the image that is an enlargement target in a case the rate of change of the detected pressure intensity is not more than the first threshold value.

12. The non-transitory computer-readable medium according to claim 9, wherein the method further comprises:

detecting a position of the operating tool pressing the screen;

detecting a movement of the operating tool based on information on the detected position; and performing, when selection of a character string is performed by the movement of the operating tool:

a processing regarding the character string selected during the movement of the operating tool, in a case the rate of change of the detected pressure intensity is more than the first threshold value after detection of a rest state or a near-rest state of the operating tool, and a canceling of a processing operation regarding the character string selected during the movement of the operating tool in a case the rate of change of the detected pressure intensity is not more than the first threshold value after the detection of the rest state or the near-rest state of the operating tool.

* * * * *